(12) United States Patent
Khramov et al.

(10) Patent No.: US 12,448,867 B2
(45) Date of Patent: Oct. 21, 2025

(54) SHALE INHIBITOR ADDITIVES, WELLBORE FLUIDS COMPRISING SAID ADDITIVES, AND METHODS OF USING SAID FLUIDS

(71) Applicant: Schlumberger Technology Corporation, Sugar Land, TX (US)

(72) Inventors: Dimitri M. Khramov, Katy, TX (US); Balakrishnan Panamarathupalayam, Houston, TX (US); Sharath Chandra Mahavadi, Lexington, MA (US); Lucas Mejia, Austin, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/693,602

(22) PCT Filed: Sep. 29, 2022

(86) PCT No.: PCT/US2022/045192
§ 371 (c)(1),
(2) Date: Mar. 20, 2024

(87) PCT Pub. No.: WO2023/055905
PCT Pub. Date: Apr. 6, 2023

(65) Prior Publication Data
US 2024/0229606 A1 Jul. 11, 2024

Related U.S. Application Data

(60) Provisional application No. 63/249,666, filed on Sep. 29, 2021.

(51) Int. Cl.
*E21B 37/06* (2006.01)
*C09K 8/08* (2006.01)

(52) U.S. Cl.
CPC .............. *E21B 37/06* (2013.01); *C09K 8/08* (2013.01); *C09K 2208/12* (2013.01)

(58) Field of Classification Search
CPC ........................................................ C09K 8/06
See application file for complete search history.

(56) References Cited

U.S. PATENT DOCUMENTS

| 3,962,122 | A | 6/1976 | Trial |
| 8,466,092 | B2 | 6/2013 | Merli et al. |

(Continued)

FOREIGN PATENT DOCUMENTS

| CN | 106350036 A | 1/2017 |
| EP | 3259329 B1 | 4/2019 |

(Continued)

OTHER PUBLICATIONS

International Search Report and Written Opinion issued in International Patent application PCT/US2022/045192 dated Jan. 20, 2023, 13 pages.

(Continued)

*Primary Examiner* — William D Hutton, Jr.
*Assistant Examiner* — Avi T Skaist
(74) *Attorney, Agent, or Firm* — Jeffrey D. Frantz

(57) ABSTRACT

Shale inhibitor additives, wellbore fluids comprising said additives, and methods using said fluids control hydration in wellbores disposed within swellable subterranean formations. The wellbore fluids contain aqueous base fluids, the shale inhibition additives, and natural biopolymeric viscosifiers, and optional encapsulating polymer agents, wherein the shale inhibition additives include amine-based shale inhibition agents. The methods circulate the wellbore fluids into the wellbores and/or maintain triamine-based shale inhibition agents of the wellbore fluids at concentrations of at least 50% by weight, based on total weights of the shale (Continued)

inhibition additives during multiple circulations of the wellbore fluids in the wellbores.

19 Claims, 13 Drawing Sheets

(56) References Cited

U.S. PATENT DOCUMENTS

| | | |
|---|---|---|
| 9,034,801 B2 | 5/2015 | Merli et al. |
| 2004/0220058 A1 | 11/2004 | Eoff et al. |
| 2009/0294179 A1 | 12/2009 | Ballard |
| 2010/0222241 A1 | 9/2010 | Merli et al. |
| 2013/0281326 A1* | 10/2013 | Merli ................ C09K 8/06 507/129 |
| 2017/0247595 A1 | 8/2017 | Cliffe |
| 2017/0327723 A1* | 11/2017 | Friedheim ................ C09K 8/24 |
| 2017/0362488 A1 | 12/2017 | Young et al. |
| 2021/0102108 A1 | 4/2021 | May et al. |

FOREIGN PATENT DOCUMENTS

| | | |
|---|---|---|
| WO | 2006041898 A2 | 4/2006 |
| WO | 2008031806 A1 | 3/2008 |
| WO | 2011083182 A2 | 7/2011 |
| WO | 2016072993 A1 | 5/2016 |
| WO | 2023055905 A1 | 4/2023 |
| WO | 2023192475 A1 | 10/2023 |

OTHER PUBLICATIONS

International Search Report and Written Opinion issued in International Patent application PCT/US2023/016891 on Jul. 20, 2023, 10 pages.

* cited by examiner

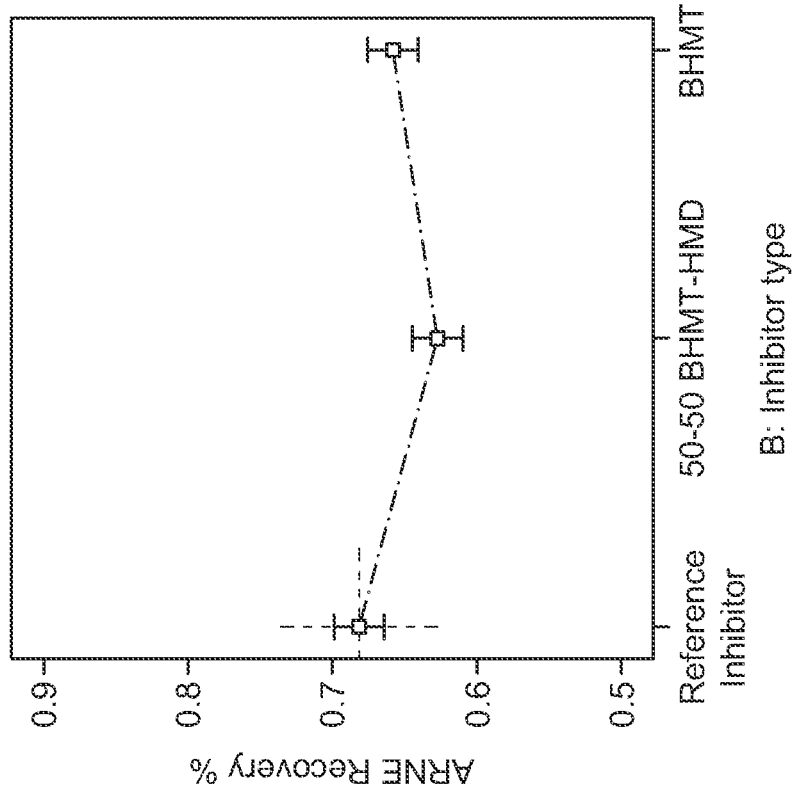
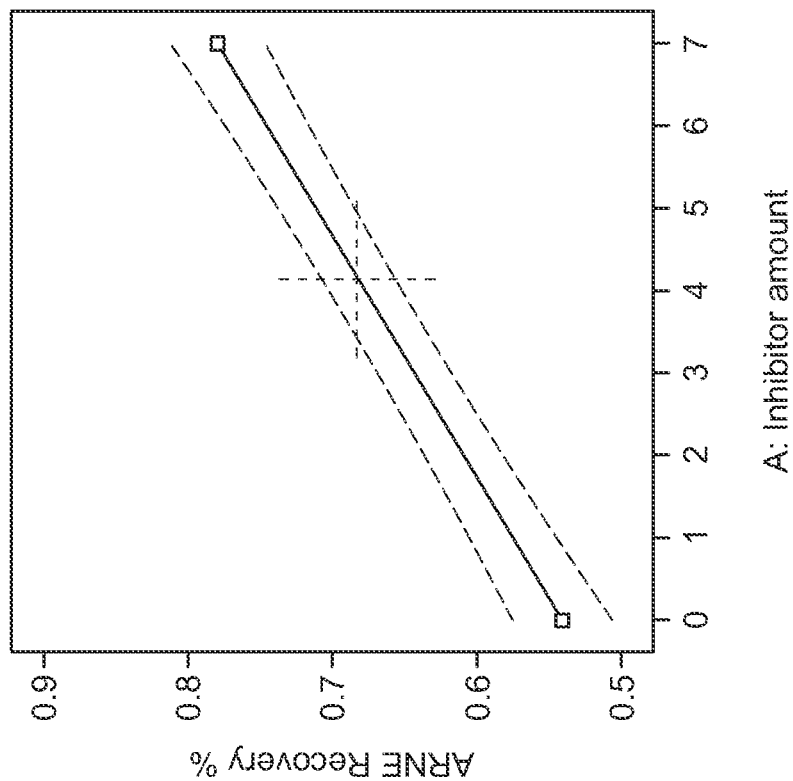
FIG. 1

SHALE INHIBITOR ADDITIVES, WELLBORE FLUIDS COMPRISING SAID ADDITIVES, AND METHODS OF USING SAID FLUIDS

CROSS-REFERENCE TO RELATED APPLICATIONS

This application is a National Stage Entry of PCT/US2022/045192, filed on Sep. 29, 2022, which claims priority to U.S. Patent Application No. 63/249,666, filed on Sep. 29, 2021, which is herein incorporated by reference in its entirety.

FIELD OF THE DISCLOSURE

The disclosure generally relates to shale inhibition additives comprising amine-based shale inhibitor agents, wellbore fluids comprising said additives and methods of using the wellbore fluids within subterranean formations. The disclosure also relates to wellbore fluids including aqueous base fluids, amine-based shale inhibitor agents, and rheological additives.

BACKGROUND

The statements in this section merely provide background information related to the present disclosure and do not constitute prior art.

Traditionally, wellbores are formed within or drilled into subterranean formations to recover hydrocarbons trapped within the subterranean formations. During wellbore drilling operations, wellbore fluids are typically circulated through the drill string, out the drill bit and upward in an annular passage provided between the drill string and the wall of the wellbore. Wellbore fluids are often used for, but not limited to: lubrication and cooling of drill bit cutting surfaces while drilling generally or drilling-in (i.e., drilling in a targeted petroliferous formation); transportation of "cuttings" (pieces of subterranean formation dislodged by the cutting action of the teeth on a drill bit) to the surface; controlling formation fluid pressure to prevent blowouts; maintaining well stability; suspending solids in the well; minimizing fluid loss into and stabilizing the subterranean formation through which the wellbore is being drilled; fracturing the subterranean formation in the vicinity of the wellbore; displacing the fluid within the wellbore with another fluid; cleaning the wellbore; testing the wellbore; transmitting hydraulic horsepower to the drill bit; fluid used for emplacing a packer; and abandoning the wellbore or preparing the wellbore for abandonment; and treating the wellbore and/or formation.

Often, wellbore fluids are water-based drilling fluids or muds (hereinafter "WBM") that are selected for use in wellbores because of lower associated costs and better environmental acceptance of the WBM in comparison to oil-based drilling fluids. As a result, the WBM may be a first and/or better option for wellbore drilling operations. However, selection of a suitable wellbore fluid may depend upon the type of subterranean formation through which the wellbore is being drilled. For example, subterranean formations may be at least partly composed of clays, including shales, mudstones, siltstones, and claystones, that swell in the presence of water, which can increase drilling times and/or costs associate with the wellbore drilling operations.

While drilling into clay-containing subterranean formations, one or more problems encountered often include, but are not limited to: bit balling; swelling or sloughing of the wellbore; stuck pipe; and dispersion of drill cuttings. Further, these problems may be exacerbated as the water content of the wellbore fluid or WBM increases due to clay hydration in aqueous environments.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a wellbore fluid may comprise an aqueous base fluid, a shale inhibition additive, and at least one polymeric viscosifiers. The shale inhibition additive may comprise at least one hydrophobic amine that is a neutralized byproduct of a Nylon-6,6 manufacturing process comprising a total active amine concentration, wherein the at least one hydrophobic amine is present at a concentration of at least about 40% of the total active amine concentration of the shale inhibition additive. Further, the at least one polymeric viscosifier.

In an embodiment, the at least one hydrophobic amine may comprise a triamine-based shale inhibition agent.

In an embodiment, the at least one polymeric viscosifiers may comprise or consist of one or more natural biopolymers that may be selected from the group consisting of xanthan gum, diutan gum, gellan gum, welan gum, schleroglucan gum, and at least one mixture thereof.

In an embodiment, the one or more natural biopolymers may be selected from the group consisting of xanthan gum, dilutan gum, and at least one mixture thereof.

In an embodiment, the at least one hydrophobic amine may further comprise a hydrophobic diamine-based shale inhibition agent that is present at a concentration of less than about 50% by weight, calculated to a total weight of the triamine- and diamine-based shale inhibition agents.

In an embodiment, the at least one hydrophobic amine may comprise a triamine-based shale inhibition agent and a diamine-based shale inhibition agent and a ratio of the triamine-based shale inhibition agent to the diamine-based shale inhibition agent is from about 1:1 to about 10:1.

In an embodiment, a concentration of the triamine-based shale inhibition agent may be at least about 75% by weight, calculated to a total weight of the triamine- and diamine-based shale inhibition agents.

In an embodiment, the triamine-based shale inhibition agent may be Bis(hexamethylene)triamine, and the diamine-based shale inhibition agent may be hexamethylenediamine.

In an embodiment, the wellbore fluid may have a pH value of about 8.5 to about 11.

In an embodiment, the wellbore fluid may further comprise one or more encapsulating polymer agents selected from the group consisting of one or more partially-hydrolyzed polyacrylamides, one or more acrylate polymers, one or more acrylate copolymers, and at least one mixture thereof.

In an embodiment, the at least one hydrophobic amine may be at least one selected from hexamethylenediamine, Bis(hexamethylene)triamine, and at least one mixture thereof.

In one or more embodiments, a method of drilling may comprise circulating a wellbore fluid in a wellbore disposed within a clay-containing subterranean formation, wherein the wellbore fluid has a pH value of about 8.5 to about 11. The wellbore fluid may comprise an aqueous base fluid, a shale inhibition additive, and at least one of at least one natural biopolymeric viscosifier agent, at least one encapsulating polymer agent, and at least one mixture thereof. The shale inhibition additive may comprise at least two shale inhibition agents, and at least one of one or more neutralizing acids, water, and/or an aqueous solution. The at least two shale inhibition agents may comprise at least one hydrophobic amine-based shale inhibition agent and at least one oligomeric amine-based shale inhibition agent.

In an embodiment, the at least one natural biopolymer viscosifier agent may be selected from the xanthan gum, diutan gum, gellan gum, welan gum, schleroglucan gum, and at least one mixture thereof, and the at least one encapsulating polymer agent may be selected from the group consisting of one or more partially-hydrolyzed polyacrylamides, one or more acrylate polymers, one or more acrylate copolymers, and at least one mixture thereof.

In an embodiment, the at least two shale inhibition agents may be blended together to produce a blend and subsequently neutralized or at least partially neutralized with the one or more neutralizing acids, and amines may be present in the blend at a concentration of about 40% of a total active amine concentration of the produced blend.

In an embodiment, the at least two hydrophobic amine-based shale inhibition agents may comprise at least one hydrophobic amine-based shale inhibition agent selected from the group consisting of Bis(hexamethylene)triamine, N, N, N',N'-Tetramethyl-1,6-hexanediamine, 4,4'-Diaminodicyclohexylmethane, 1,8-diaminooctane, 1,10-diaminodecane, 1,12-diaminododecane, 1,5-diaminopentante, 1,4-diaminobutante, at least one cyclic amine, and at least one mixture thereof, and the at least one hydrophobic amine-based shale inhibition agent may be present at a concentration of at least 50% by weight, calculated to a total weight of the at least two shale inhibition agents.

In an embodiment, the at least one oligomeric amine-based shale inhibition agent may comprise hexamethylenediamine.

In an embodiment, the at least one hydrophobic amine-based shale inhibition agent may be Bis(hexamethylene)triamine.

In an embodiment, the Bis(hexamethylene)triamine may be present at a concentration of at least 75% by weight, calculated to a total weight of an amine stream present in the inhibitor or a total weight of an amine-based inhibition agent(s) present in the inhibitor.

In one or more embodiments, a method of drilling may comprise emplacing a wellbore fluid in a wellbore during a first circulation of the wellbore fluid within the wellbore, wherein the wellbore is disposed within a clay-containing subterranean formation, the wellbore fluid has a pH value of about 8.5 to about 11. The wellbore fluid may comprise an aqueous base fluid, a shale inhibition additive, and at least one natural biopolymer viscosifiers. The shale inhibition additive may comprise at least one triamine-based shale inhibition agent and at least one diamine-based shale inhibition agent, wherein the at least one triamine-based shale inhibition agent is present at a concentration of at least about 50% by weight, calculated to a total weight of the at least one triamine-based shale inhibition agent and the at least one diamine-based shale inhibition agent. The method may further comprise maintaining the concentration of the at least one triamine-based shale inhibition agent at or above about 50% by weight, calculated to the total weight of the at least one triamine-based shale inhibition agent and the at least one diamine-based shale inhibition agent, during at least one subsequent second circulation of the wellbore fluid within the wellbore.

In an embodiment, the method may further comprise loading shale inhibition additive into the wellbore fluid before the first and the at least one subsequent second circulations such that concentrations of the triamine-based shale inhibition agent are at or above about 75% by weight, calculated to the total weight of the triamine-based shale inhibition agent and the diamine-based shale inhibition agent, during the first and the at least one subsequent second circulations.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 illustrates graphical results of a comprehensive response surface with multiple changing variables, according to one or more examples of the present disclosure.

DETAILED DESCRIPTION

Figure 2:
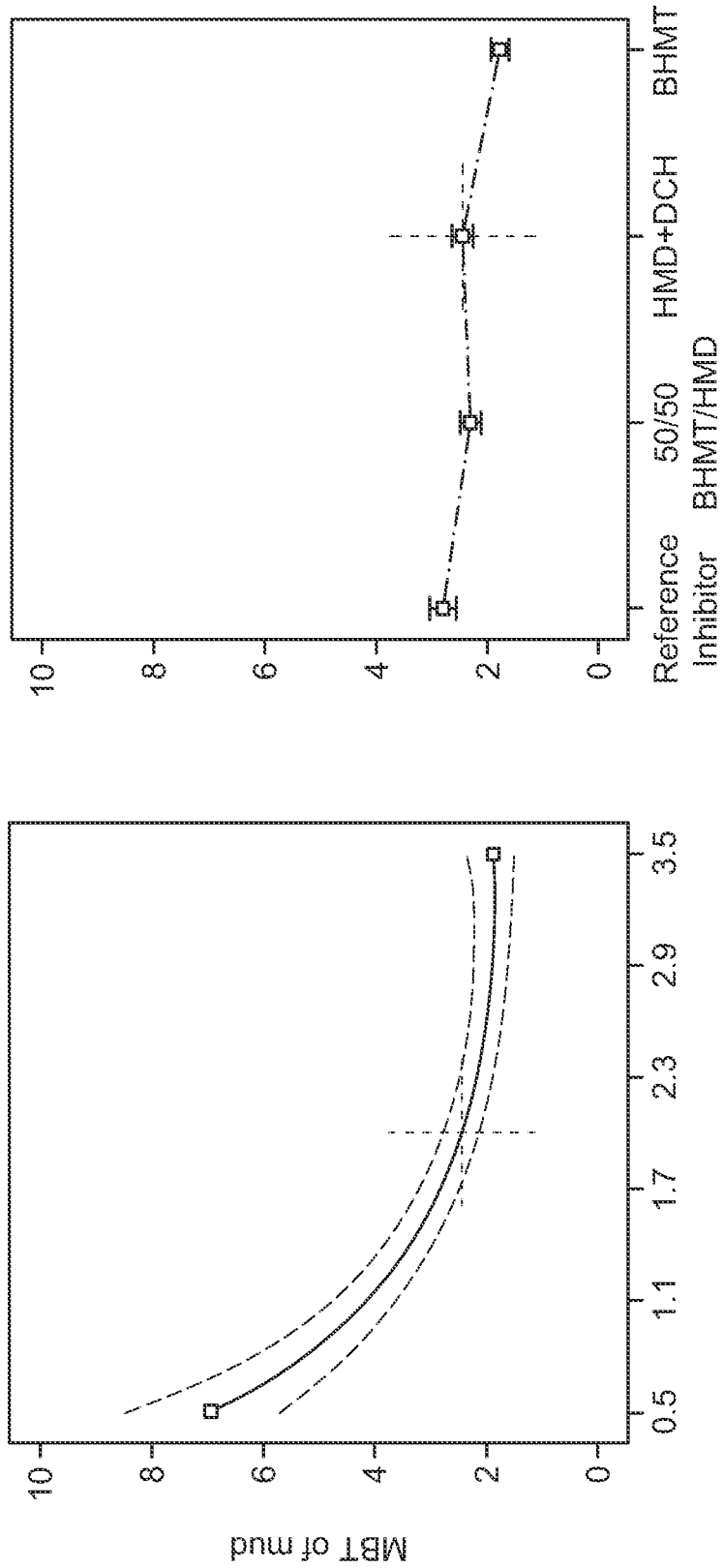
FIG. 2 illustrates graphical MBT test results for bentonite with different shale inhibitors, according to one or more examples of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." As used herein, the phrases "selected from the group consisting of," "chosen from," and the like include mixtures of the specified compounds and/or materials. Terms, such as, for example, "contains" and the like are meant to include "including at least" unless otherwise specifically noted.

Herein, the term "about" when applied to a value generally means within the tolerance range of the equipment used to produce the value, or in some examples, means plus or minus 20%, plus or minus 15%, plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Where a numerical limit or range is stated, the endpoints are included. Also, all values and subranges within a numerical limit or range are specifically included as if explicitly written out. Moreover, examples herein are intended to be illustrative only and are presented for discussion purposes and not by way of limitation.

Embodiments disclosed herein relate to shale inhibition additives (hereinafter "inhibition additives") that may be incorporated into wellbore fluids for use in drilling at least one well or wellbore (collectively referred to hereinafter as "wellbore") through a subterranean formation containing at least one shale that swells in the presence of water. Wellbore fluids in accordance with the present disclosure may be formulated to include shale inhibition agents (hereinafter "inhibition agents") that promote retention of the wellbore fluids within the wellbore and prevent fluid loss due to absorption by clays and other hydrophilic minerals. In one or more embodiments, the inhibition additives disclosed herein may comprise at least two amine-based inhibition agents, and the wellbore fluids disclosed herein may comprise at least one base fluid, one or more inhibition additives, and one or more rheological additives, such as, for example, one or more polymeric viscosifiers encapsulators, and/or at least one mixture thereof.

Inhibition of Shale and/or Clay Swelling

During the drilling of a subterranean wellbore, one or more negative clay-fluid interactions may have adverse impacts on the wellbore drilling operations. In one or more embodiments, the one or more negative clay-fluid interactions may include at least clay swelling during the wellbore drilling operations. For example, an overall increase in bulk volume accompanying clay swelling may impede removal of cuttings from beneath the drill bit, may increase friction between the drill string and the sides of the borehole, and/or may inhibit formation of the thin filter cake that seals formations. Clay swelling may also create one or more additional drilling problems, such as, for example, loss of circulation or stuck pipe that slows wellbore drilling operations and increases wellbore drilling costs.

Clay minerals encountered in subterranean formations are often crystalline in nature, which may dictate the response observed when exposed to the drilling fluids disclosed herein. Clays may have a flaky, mica-type structure made up of crystal platelets stacked face-to-face. Each platelet is called a unit layer, and the surfaces of the unit layer are called basal surfaces. Each unit layer is composed of multiple sheets, which may include octahedral sheets and tetrahedral sheets. Octahedral sheets are composed of either aluminum or magnesium atoms octahedrally coordinated with the oxygen atoms of hydroxyls, whereas tetrahedral sheets contain silicon atoms tetrahedrally coordinated with oxygen atoms.

In clay mineral crystals, atoms having different valences may be positioned within the sheets of the structure to create a negative potential at the crystal surface, which causes cations to be adsorbed thereto. These adsorbed cations are called exchangeable cations because they may chemically trade places with other cations when the clay crystal is suspended in water. In addition, ions may also be adsorbed on the clay crystal edges and exchange with other ions in the water.

The clay crystal structure and the exchangeable cations adsorbed on the crystal surface may affect clay swelling. Clay swelling is the phenomenon in which water molecules surround a clay crystal structure and position themselves to increase the d-spacing of the structure, which results in a measurable increase in volume. Two types of swelling may occur: surface hydration; and osmotic swelling.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased d-spacing. Additional swelling may occur when water penetrates between layers of non-swelling clays, such as, for example, barite.

Osmotic swelling is a second type of swelling, wherein the concentration of cations between unit layers in a clay mineral is higher than the cation concentration in the surrounding water. As a result, water is osmotically drawn between the unit layers and the d-spacing is increased. Osmotic swelling results in larger overall volume increases than surface hydration. However, only certain clays, such as, for example, sodium montmorillonite swell in this manner.

In one or more embodiments, clay swelling is inhibited, reduced, or prevented through use of the shale inhibition agents, shale inhibition additives, and wellbore fluids disclosed herein which reduce the aforementioned drawbacks of conducting operations in clay-containing subterranean formations. The wellbore fluids disclosed herein may include a base fluid, the one or more shale inhibition additives, comprising the one or more inhibition agents, along with one or more wellbore fluid additives dependent upon the particular operations, operational locations, and/or applications.

Inhibition Additives

In one or more embodiments, the inhibition additives disclosed herein may comprise one or more inhibition agents. The one or more inhibition agents may be, for example, one or more amine-based inhibition agents. The one or more inhibition agents may be efficient shale inhibitors and comprise one or more oligomeric amines, one or more hydrophobic amines, or one or more mixtures thereof. The inhibition agents may be two or more amines that may be oligomeric amines and hydrophobic amines. Amines having increased or improved hydrophobicity provide advantageous structure-activity when utilized as the one or more amine-based inhibition agents. However, amines that exhibit too high of hydrophobicity may not be as advantageous because such amines may not be dissolvable in water. The inhibition agents disclosed herein may be present in the wellbore fluids at a concentration of about 0.5 to about 4 vol. %, about 1 to about 3 vol. %, or about 1.5 to about 2.5 vol. %, wherein all volume percentages are calculated to total volumes of the wellbore fluids. In some embodiments, the concentration of the inhibition agents may be less than about 0.5 vol. % or greater than about 4 vol. %, wherein all volume percentages are calculated to total volumes of the wellbore fluids.

In some embodiments, the one or more oligomeric amines may comprise one or more diamines, one or more triamines, one or more polyamines, and/or a mixture thereof. For example, the one or more oligomeric amines may be hexamethylenediamine (hereinafter "HMD"), Bis(hexamethylene)triamine (hereinafter "BHMT"), and/or one or more mixtures thereof. In embodiments, the one or more oligomeric amines may be oligomers of ethylenediamine, propylenediamine, butylenediamine, 1,5-diaminopentane, and oligomers of 1,6-diaminohexane, or other diamines that may be oligomerized or obtained as a byproduct of diamine production. In at least one embodiment, the one or more oligomeric amines may comprise one or more cyclic amines.

In one or more embodiments, the inhibition agents may comprise one or more polyamines that have been derivatized with at least one acid anhydride and/or at least one organic acid. For example, the at least one acid anhydride may be at least one of acetic anhydride, propionic anhydride, and at least one mixture thereof. The at least one organic acid may comprise at least one (1) carbon atom and not more than about twenty (20) carbon atoms, such as, for example, formic acid up to benehic acid or at least one mixture of said organic acids. The derivatization of the one or more polyamines may be at least about 10 mol % derivatized, at least about 30 mol % derivatized, or up to about 50 mol % derivatized based on total content of free amines available for derivatization. In other embodiments, the inhibition agents may be one or more polyamines treated with at least one cyclic anhydride which may produce a reaction product having amide bonds and pendant acid groups. The reaction product may be utilized as both an efficient a shale inhibitor and shale encapsulator. The at least one cyclic anhydride may be, for example, succinic anhydride, maleic anhydride, phthalic anhydride, glutaric anhydride, or at least one mixture thereof.

In some embodiments, hydrophobicity of the amines may be improved or increased by one or more methylation methods. Methylation methods may be advantageous because the resulting amines are not "deactivated" by the methylation methods. Acetylation converts amines into amides which are not bondable to clay by cation exchange. Methylation keeps amines available for bonding, but methylation increases hydrophobicity of the resulting amines. In some embodiments, methylation be carried out with one or more typical alkylating agents, such as, for example, methyl chloride, methyl sulfate, and/or similar alkylating agents, or by reacting with a mixture of formaldehyde and formic acid. In one embodiment, the one or more methylation methods may comprise at least one Eschweiler-Clarke methylation or reaction.

Still further, the one or more hydrophobic amines may comprise one or more diamines, one or more triamines, one or more polyamines, one or more oligomers, and/or mixtures thereof. For example, the one or more hydrophobic amines may be BHMT, N,N,N',N'-Tetramethyl-1,6-hexanediamine, 4,4'-Diaminodicyclohexylmethane, 1,8-diaminooctane, and/or one or more mixtures thereof. In at least one embodiment, the one or more hydrophobic amines may comprise one or more cyclic amines.

In embodiments, inhibition agents of the inhibition additives disclosed herein may comprise one or more linear molecules, one or more non-linear or branched molecules, or mixtures thereof. The inhibition agents may have, but are not limited to, molecular formulas comprising at least 2 nitrogen atoms or at least 3 nitrogen atoms and/or at least 6 carbon atoms, at least 8 carbon atoms, at least 10 carbon atoms, at least 12 carbon atoms, at least 15 carbon atoms, no more than 30 carbon atoms, no more than 25 carbon atoms, no more thand 20 carbon atoms, or no more than 15 carbon atoms. In some embodiments, the inhibition agents of the inhibition additives may be the same as, substantially the same as, similar to, or substantially similar to one or more of the inhibitors, compounds, and/or polyamines as disclosed in U.S. Pat. No. 3,962,122, which is incorporated herein in its entirety. Additionally, the inhibition agents of the inhibition additives disclosed herein may have, but are not limited to, molecular masses of at least about 100 g/mol, at least about 110 g/mol, at least about 115 g/mol, at least about 140 g/mol, at least about 170 g/mol, at least about 200 g/mol, at least about 300 g/mol, at least about 400 g/mol, at least about 500 g/mol, no more than about 500 g/mol, no more than about 450 g/mol, no more than about 400 g/mol, no more than about 300 g/mol, no more than about 275 g/mol, no more than about 250 g/mol, or no more than about 220 g/mol. In at least one embodiment, the inhibition agents may have, but are not limited to, a molecular mass range from about 100 g/mol to about 316 g/mol or about 416 g/mol. Further, the inhibition agents of the inhibition additives disclosed herein may have, but are not limited to, boiling points of about 92° C., at least about 195° C., at least about 200° C., at least about 205° C., at least about 210° C., at least about 220° C., or at least about 225° C. Still further, the inhibition agents of the inhibition additives disclosed herein may have, but are not limited to, densities of at least about 0.81 g/cm$^3$, at least about 0.84 g/cm$^3$, at least about 0.93 g/cm$^3$, or at least about 0.95 g/cm$^3$.

In some embodiments, the inhibition agents of the inhibition additives disclosed herein may have elevated or high pKa values that may be at least partially protonated or entirely protonated such that the resulting partially or fully protonated inhibition agents have decrease smell and/or elevated or higher pH values. For example, the inhibition agents may have, but are not limited to, pKa values of about 8 to about 13, about 9 to about 12, or at least 10. In an embodiment, the inhibition agents may have, but are not limited to, pKa values over about 10. In other embodiments, a portion of the nitrogen atoms of the inhibition agents may be protonated at the pH of the wellbore fluid. For example, at least about 50% of the nitrogen atoms of the inhibition agents may be protonated at the pH of the wellbore fluid. The inhibition agents may have a quaternary nature that is directedly related to or based on at least one of the pKa value, the pH value, and/or the percentage of protonation. Said quaternary nature may allow the inhibition agents to participate in cation exchange with clay which provides stabilization of the clay. In some embodiment, quaternization may be achieved by alkylation of tertiary one or more nitrogens. The quat produced by alkylation is a so-called permanent charge which may reduce the importance of pH on a function of the inhibition agent.

In embodiments, the one or more amine-based inhibition agents may include one or more byproducts of one or more industrial manufacturing processes. For example, a Nylon-6,6 manufacturing process produces intermediate HMD byproducts that are usable as shale inhibitors of the inhibition additives disclosed herein. Main components of the HMD byproducts are distillation byproducts from HMD purification. There are two main streams of byproducts which are: "light ends" or "top streams" (hereinafter "the light ends" or "the top streams") that may comprise mainly 1,2-diaminocyclohexane (hereinafter "DCH") in addition to HMD; and "heavies" or "bottom streams" (hereinafter "the heavies" or "the bottom streams") which may comprise HMD in addition to BHMT. In one or more embodiments, the inhibition agents disclosed herein comprise at least HMD and BHMT, and the inhibition additives disclosed herein comprise at least HMD and BHMT blended together as shale inhibitors. However, even without blending together, the "light ends" and the "heavies" may contain one or more other components and/or one or more impurities. In some embodiments, each of DCH, HMD, and BHMT may be individually separated from each other, and the separated HMD or the separated BHMT may be usable as at least one inhibition agent and/or at least one inhibition additive disclosed herein. In other embodiments, the at least one inhibition agent and/or the at least one inhibition additive disclosed herein may comprise and/or be at least one byproduct from at least one HMD purification process that comprises entirely or partially the heavies or the bottom streams, at least two co-product streams from at least HMD manufacturing process, or at least one combination thereof.

In one or more embodiments, the inhibition additive disclosed herein comprises a triamine-based inhibition agent, a tetramer-based inhibition agent, and an optional diamine-based inhibition agent as shale inhibitors. The oligomers disclosed herein may be, but are not limited to, repeat units of a defined monomer which may comprise at least 2 or more carbon atoms. If the triamine-, tetramer-, and/or diamine-based inhibition agents are present as a blend in the inhibition additive, the triamine-based inhibition agent and/or the tetramer-based inhibition agent or the blend may surprisingly and unexpectedly exhibit; improved performances when directly compared to the diamine-based inhibition agent; improved stabilities across a plurality of pH values; improved optimization of system formulations; and/or improved sustainability profiles of drilling operations. In some embodiments, the inhibition additive may comprise one or more higher oligomers past or beyond triamine- and/or tetramer-based inhibition agents and/or the one or more higher oligomers may also surprisingly and unexpectedly exhibit improved performances and/or stabilities when directly compared to the diamine-, triamine-, and/or tetramer-based inhibition agents. In one or more embodiments, the blended inhibition additive comprising the bottom steams (i.e., co-products) of the HMD purification process and/or containing both HMD and BHMT improve sustainability profiles of drilling operations by increasing contents of actives in the inhibition additives disclosed herein which may improve and/or reduce costs associated with transportation of the inhibition additives to drilling locations.

In one or more embodiments, the triamine-based inhibition agent may be BHMT, and, when present in the inhibition additive, the diamine-based inhibition agent may be HMD. In some embodiments, the triamine-based inhibition agent may be one or more compounds that may be similar or substantially similar to BHMT. When a blend of both the triamine- and diamine-based inhibition agents (hereinafter "blended inhibition additive") are present in the inhibition additive, a ratio of BHMT to HMD in the blended inhibition additive may be at least about 1:1, at least about 1.5:1, at least about 2:1, at least about 5:1, at least about 10:1, or at least 20:1. Maintaining the ratio disclosed herein surprisingly and unexpectedly improves efficiency of the blended inhibition additive comprising a blend of the triamine- and diamine-based inhibition agents as shale inhibitors. Moreover, the blended inhibition additive exhibits improved or increased efficiency when the amount of BHMT present in the blended inhibition additive is at least equal to or greater than the amount of HMD present in the blended inhibition additive.

In some embodiments, BHMT may be present at a concentration of at least about 20% by weight, at least about 30% by weight, least about 40% by weight, at least about 50% by weight, at least about 75% by weight, at least about 99% by weight, less than about 100% by weight, less than about 90% by weight, less than about 80% by weight, less than about 70% by weight, or less than about 60% by weight, wherein all weights are calculated to total weights of the blended inhibition additive. Further, HMD may be present at a concentration of at least about 1% by weight, at least about 5% by weight, at least about 10% by weight, at least about 25% by weight, or less than about 50% by weight, wherein all weight percentages are calculated to total weights of the blended inhibition additive. Maintaining the concentrations disclosed herein improve efficiency of the blended inhibition additives comprising the blends of the triamine- and diamine-based inhibition agents as shale inhibitors.

In one or more embodiments, the inhibition agents or the blended inhibition additive disclosed herein may be prepared from at least one amine stream. During preparation of the inhibition agents or the blended inhibition additive, the at least one amine stream may neutralize or partially neutralized and/or formulated such that an amine content of the prepared inhibition agents may be about 30% by weight, about 35% by weight, about 40% by weight, about 45% by weight, or about 50% by weight, wherein all weight percentages are calculated to total weights of the inhibition additives. The remainder of the prepared inhibition additives may comprise one or more acids, water, and/or at least one aqueous-based fluid or solution. As a result, the prepared inhibition additives or the blended inhibition additive may exhibit acceptable or improved pH values and/or pour point values when the prepared inhibition additives or one or more blended inhibition additives are incorporated into or included within the wellbore fluids disclosed herein.

Wellbore Fluid Additives

Wellbore fluid additives disclosed herein may include one or more rheological additives, one or more polymeric shale inhibitor additives, or at least one mixture thereof. For example, the one or more rheological additives may comprise one or more viscosifying agents, and the one or more polymeric shale inhibitor additives may comprise one or more encapsulating polymer agents. Other known wellbore fluid additives may be incorporated into the wellbore fluids disclosed herein as known to one of ordinary skill in the art.

The one or more viscosifying agents may alter or maintain the viscosity and potential changes in viscosity of the wellbore fluid. Viscosity control may be needed in some scenarios in which a subterranean formation contains varying temperature zones. For example, the wellbore fluid may undergo temperature extremes of nearly freezing temperatures to nearly the boiling temperature of water or higher as the wellbore fluid moves from the surface to the drill bit and back to the surface.

In one or more embodiments, the one or more viscosifying agents may be selected from one or more natural biopolymers that are usable in WBM. In embodiments, the one or more natural biopolymers may include starches, celluloses, and/or various gums, such as xanthan gum, diutan gum, gellan gum, welan gum, schleroglucan gum and/or at least one or more mixtures thereof. Said starches may include potato starch, corn starch, tapioca starch, wheat starch, rice starch, and/or at least one mixture thereof. In some embodiments, the one or more viscosifying agents may comprise at least one gum, such as, for, example, xanthan gum, diutan gum, or mixtures thereof. In accordance with various embodiments of the present disclosure, the one or more biopolymer viscosifying agents may be unmodified (i.e., without derivitization). In embodiments, the one or more viscosifying agents may include, for example, at least one of POLYPAC® UL polyanionic cellulose (PAC), DUOVIS®, and BIOVIS®, each available from M-I L.L.C. (Houston, Tex.).

In some embodiments, one or more viscosifying agents may be one or more polymeric viscosifiers comprising synthetic polymers that resist degradation over time, and/or under high temperature/high pressure conditions. Thermal and pressure stable polymeric viscosifiers polymers may include polymers, copolymers, block copolymers, and higher order copolymers (i.e., a terpolymer or quaternary polymer, etc.) composed of monomers that may include 2-acrylamido-2-methylpropanesulfonate, acrylamide, methacrylamide, N,N dimethyl acrylamide, N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, poly(2-ethyl-2-oxazoline), C2-C12 olefins, ethylene, propylene, butene, butadiene, vinyl aromatics, styrene, alkylstyrene, acrylic acid, methacrylic acid, vinyl alcohol, partially hydrolyzed acrylamide or methacrylamide, derivatives thereof, and/or mixtures thereof. In yet other embodiments, polymeric viscosifiers may include polyalkylene amines and polyethers, such as, for example, polyethylene oxides, polypropylene oxide, and/or mixtures thereof.

In one or more embodiments, the polymeric viscosifiers may include, for example, thermally stable polymeric viscosifiers, such as, for example, DUROTHERM™, DURALON™, available from MI, L.L.C. (Houston, Tex.), KEM-SEAL™, available from Baker Hughes, Inc. (Houston, Tex.), DRISCAL®-D, available from Phillips Petroleum Co. (Bartlesville, Olka), CYPAN™, available from National Oilwell Varco (Houston, Tex.), and ALCOMER™ 242, available from Allied Colloids Ltd (United Kingdom). In other embodiments, the one or more viscosifying agents may be, for example, IDCAP™ D, available from MI L.L.C. (Houston, Tex.).

In embodiments, the one or more viscosifying agents may comprise additional components comprising at least one organic compound. The additional components may be compounds comprising at least one aldehyde group or two aldehyde groups. For example, the at least one organic compound may be a dialdehyde, such as, for example, glyoxal.

The wellbore fluids disclosed herein may contain one or more viscosifying agents in an amount of about 0.5 to about 5 pounds per barrel (hereinafter "ppb"), about 0.25 to about 2 ppb, or up to about 4 ppb. However, the concentration ranges may be dependent upon, for example, particular wellbore diameters, annular velocities, cutting carrying capacities, and/or quiescent times expected or desired. The one or more viscosifying agents may have, but are not limited to, viscosities of about 1.2 to about 1.8 Pa*s or about 1.1 to about 1.9 Pa*s and a specific gravity of about 1.2 to about 1.8, about 1.4 to about 1.6, or about 1.5. In some embodiments, the amount of the one or more viscosifying agents may be less than about 0.5 ppb or greater than about 5 ppb and/or the viscosity may be less than about 1.2 Pa*s or greater than about 1.9 Pa*s.

In one or more embodiments, the wellbore fluids disclosed herein may comprise one or more encapsulating polymer agents that may form a viscous polymer coating, film, or barrier on, for example, cuttings and walls of the wellbores. The viscous polymer coating, film, or barrier may seal microfractures of the shale and/or slow diffusion of water molecules into the shale which may slow hydration and disintegration. In embodiments, the one or more encapsulating polymer agents may comprise at least one of one or more partially-hydrolyzed polyacrylamides, one or more acrylate polymers, one or more acrylate copolymers, and mixtures thereof. In an embodiment, the one or more encapsulating polymer agents may be acrylic acid copolymer encapsulators. The one or more encapsulating polymer agents may be present in the wellbore fluids at concentrations of about 1 $kg/m^3$ to about 12 $kg/m^3$, or no more than about 3 or about 4 vol. %, calculated to total volumes of the wellbore fluids. In embodiments, the one or more encapsulating polymer agents may have specific gravities of about 1.2 to about 1.8 or about 1.4 to about 1.6.

Moreover, the wellbore fluids disclosed herein may include weight materials or weighting agents to increase the densities of the wellbore fluids. The weighting materials or agents may increase the densities of the wellbore fluids so as to prevent kick-backs and blow-outs. Thus, the weighting materials or agents may be added to the wellbore fluids in functionally effective amounts largely dependent on the nature of the subterranean formations being drilled. Weighting agents or density materials usable in the wellbore fluids disclosed herein include galena, hematite, magnetite, iron oxides, illmenite, barite, siderite, celestite, dolomite, calcite, and the like, mixtures and combinations of these compounds and similar such weight materials that may be used in the formulations of the wellbore fluids. The quantity of such material added, if any, may depend upon the desired density of the final compositions of the wellbore fluids. In some instances, weighting agent is added to result in a drilling fluid density of up to about 24 ppg. The weighting agent may be added up to 21 ppg in some embodiments, and up to 19.5 ppg in other embodiments.

In some embodiments, other wellbore fluid additives may also include, for example, one or more thinners and/or one or more fluid loss control agents which may be optionally added to wellbore fluids disclosed herein. Of these additional materials, each may be added to the formulation in a concentration as rheologically and functionally required by wellbore drilling conditions and/or operations.

Wellbore Fluids

Wellbore fluids disclosed herein may contain a base fluid that is entirely aqueous base or contains a full or partial oil-in-water emulsion. In some embodiments, the wellbore fluid may be any water-based fluid that is compatible with the inhibition additives and/or the inhibition agents disclosed herein. In some embodiments, the base fluid may include at least one of fresh water or mixtures of water and water soluble organic compounds.

In one or more embodiments, the wellbore fluids may contain a brine such as seawater, aqueous base fluids, or solutions wherein the salt concentration is less than that of sea water, or aqueous fluids or solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated into given brines include any one or more of those present in natural seawater or any other organic or inorganic dissolved salts. Additionally, brines that may be used in the wellbore fluids disclosed herein may be natural or synthetic, with synthetic brines tending to be much simpler in constitution. One of ordinary skill would appreciate that the above salts may be present in the base fluids or may be added according to the methods disclosed herein. Further, the amount of the aqueous based continuous phase should be sufficient to form a water-based drilling fluid or mud (hereinafter "WBM"). This amount may range from nearly 100% of the wellbore fluids to less than about 30% of the wellbore fluids by volume. In some embodiments, the aqueous based continuous phase may constitute from about 95 to about 30% by volume or from about 90 to about 40% by volume of the wellbore fluids.

In some embodiments, the wellbore fluids disclosed herein may be high performance WBMs comprising the inhibition agents or blended inhibition additive disclosed herein as an inhibitor of reactive shale swelling. Prevention of shale swelling is key to WBM performance because wellbore integrity depends on inhibitive properties of WBM. Additionally, prevention of shale swelling and consequent reduction in shale dispersion reduces costs associate with the wellbore drilling processes by reducing the volumes of dilution needed to maintain acceptable viscosities for the WBMs. In embodiments, the high performance WBMs disclosed herein may comprise at least the aqueous base fluid, the inhibition additive comprising the inhibition agents or the blended inhibition additive, the one or more viscosifying agents, and the one or more encapsulating polymer agents, and mixtures thereof. The wellbore fluids disclosed herein may have pH values of less than about 11.5, about 8.5 to about 11, about 9.0 to about 10.5, or about 9.5 to about 10.5.

In yet another embodiment, the wellbore fluids disclosed herein may be used alone or in combination with one or more conventional or additional additives. The additional additives, that may further be included in the present wellbore fluids, may include, for example, wetting agents, organophilic clays, additional viscosifiers, fluid loss control agents, surfactants, dispersants, interfacial tension reducers, pH buffers, mutual solvents, additional thinners, additional thinning agents, cleaning agents, or mixtures thereof. Inclusion of such additional additives in the present wellbore fluids should be well known to one of ordinary skill in the art of formulating wellbore fluids or WBMs.

In one or more embodiments, one or more surprising and unexpected synergies are achievable with wellbore fluids disclosed herein having pH values of about 8.5 or about 9 to about 11 or about 12 and comprising at least the aqueous base fluids, the one or more amine-based inhibition agents or the blended inhibition additive, and the one or more viscosifying agents. In other embodiments, one or more additional surprising and unexpected synergies are achievable with wellbore fluids disclosed herein having pH values of about 8.5 or about 9 to about 11 or about 12 and comprising at least the aqueous base fluids, the one or more amine-based inhibition agents or the blended inhibition additive, the one or more viscosifying agents, and one or more encapsulating polymer agents. In some embodiments, additional surprising and unexpected synergies are achievable with wellbore fluids disclosed herein having pH values of about 8.5 or about 9 to about 10.5 or about 11 or about 12 and/or comprising the triamine-based inhibition agents in the blended inhibition additive present at concentrations of at least about 50% or at least about 75% by weight, calculated to total weights of the blended inhibition additive.

In one or more embodiments, the methods disclosed herein may include providing, formulating, and/or mixing a wellbore fluid (e.g., a drilling fluid, reservoir drill-in fluid, fracturing fluid, etc.) that contains the aqueous base fluid, the inhibition additives comprising the inhibition agents or the blended inhibition additive, the viscosifying agents, and/or the encapsulating polymer agents. In some embodiments, the methods disclosed herein may emplace, dispose, and/or provide the wellbore fluids within wellbores of subterranean formations. The above-mentioned agents may be mixed into the wellbore fluid individually or as a multi-component additive that contains the inhibition agents or the blended inhibition additive, the viscosifying agents, the encapsulating agents, and/or the additional additives. The above-mentioned agents and/or the additional additives may be added to the wellbore fluids prior to, during, or subsequent to emplacing or circulating the wellbore fluids in the subterranean formations.

The wellbore fluids disclosed herein may be used in methods for drilling wellbores into the subterranean formations in a manner similar to those wherein conventional wellbore fluids are used. In the methods of drilling, the wellbore fluid disclosed herein may be circulated through the drill pipe, through the bit, and up the annular space between the pipe and the formation or steel casing to the surface. The wellbore fluids disclosed herein may perform several different functions during the methods, such as, for example, cooling the bit, removing drilled cuttings from the bottom of the hole, suspending, coating, and/or encapsulating the cuttings, coating walls of the wellbore, and/or weighting the material within the wellbore when circulation is interrupted.

The inhibition agents or the blended inhibition additive, the viscosifying agents, the encapsulating agents, and/or the additional additives may be added to the base fluids on location at a well-site where it is to be used, or may carried out at other locations than the well-site. If the well-site location is selected for carrying out this step, the inhibition agents or the blended inhibition additive, the viscosifying agents, the encapsulating agents, and/or the additional additives may be dispersed in the base fluids, and the resulting wellbore fluids may be emplaced, disposed, and/or circulated in the wellbores using techniques known in the art.

In one or more embodiments, the components of the wellbore fluids disclosed herein (i.e., the aqueous base fluids, the inhibition agents or the blended inhibition additive, the viscosifying agents, the encapsulating agents, and/or the additional additives) may be added to the wellbores simultaneously or sequentially, depending on the demands of the downhole environments. In some embodiments, the wellbore fluids disclosed herein may be emplaced or provided into the wellbores before or after adding one or more preflush or overflush fluids.

In some embodiments, the methods disclosed herein may reduce the swelling of shale in the wellbores whereby the wellbore fluids disclosed herein are circulated in the wellbores. The methods and wellbore fluids disclosed herein may be utilized in a variety of subterranean operations that involve subterranean drilling, drilling-in (without displacement of the fluid for completion operations) and fracturing. Examples of suitable subterranean drilling operations include, but are not limited to, water well drilling, oil/gas well drilling, utilities drilling, tunneling, construction/installation of subterranean pipelines and service lines, and the like. In some embodiments, the methods and wellbore fluids disclosed herein may be used to stimulate the fluid production.

In other embodiments, the methods disclosed herein may circulate, provide, and/or dispose the present wellbore fluids in wellbores disposed within a clay-containing subterranean formations. The present wellbore fluids may have a pH value of about 8.5 or about 9 to about 11 and/or comprise aqueous base fluids, the shale inhibition additives or the blended inhibition additive, at least one of the natural biopolymeric viscosifier agents, at least one of the encapsulating polymer agents, or mixtures thereof. The shale inhibition additives may comprise at least one amine-based shale inhibition agent. In some embodiments, the at least one amine-based shale inhibition agent or the blended inhibition additive may comprise at least one hydrophobic amine-based shale inhibition agent and at least one oligomeric amine-based shale inhibition agent, wherein the at least one hydrophobic amine-based shale inhibition agent may be the triamine-based shale inhibition agent and/or the at least one oligomeric amine-based shale inhibition agent may be a diamine-based shale inhibition agent. The hydrophobic amine-based shale inhibition agents may be present at concentrations of at least about 50% or about 75% by weight, calculated to total weights of the shale inhibition additives or the blended inhibition additive. The methods disclosed herein further comprising loading or adding the hydrophobic amine-based shale inhibition agents into the shale inhibition additives or the blended inhibition additive of the wellbore fluids prior to circulating, providing and/or disposing the wellbore fluids in the wellbores such that the concentrations of triamine-based shale inhibition agents are at least about 50% or at least about 75% by weight, calculated to the total weights of the shale inhibition additives or the blended inhibition additive.

Further, the methods disclosed herein may maintain the concentrations of the triamine-based shale inhibition agents at about 50% or more by weight, calculated to the total weights of the shale inhibition additives or the blended inhibition additive, during a first or initial circulation of the present wellbore fluids in the wellbores and/or one or more subsequent second circulations of the present wellbore fluids in the wellbores. The methods disclosed herein may recover or remove the present wellbore fluids from the wellbores after the first or initial circulation and/or the one or more subsequent second circulations of the wellbore fluids in the wellbores. Still further, the methods disclosed herein may maintain the concentrations of the triamine-based shale inhibition agents by adding or loading additional shale inhibition additives or the blended inhibition additive, additional hydrophobic amine-based shale inhibition agents, and/or additional triamine-based shale inhibition agents into the present wellbore fluids after the initial or first circulation and/or before the one or more subsequent second circulations of the wellbore fluids in the wellbores. As a result, the methods disclosed herein may reduce the swelling of shales in the wellbores during the initial or first circulations and the one or more subsequent second circulations of the present wellbore fluids during portions of or across entire wellbore drilling operations.

In at least one embodiment, the present inhibition additives or the blended inhibition additive comprising blends of the amine-based inhibition agents disclosed herein are usable as efficient and/or effective shale inhibitors. Ratios of the hydrophobic amine-based shale inhibition agents to the oligomeric amine-based shale inhibition agents in accordance with the present disclosure are from about 1:1 and up to about 5:1 or about 10:1. In some embodiments, the triamine-based inhibition agents disclosed herein are present at concentrations of at least about 50% or at least about 75% by weight, calculated to the total weights of the inhibition additives or the blended inhibition additive.

In one or more embodiments, at least one aqueous fluid system (hereinafter "AFS") configured and/or adapted for one or more wellbore operations is disclosed herein. In some embodiments, the AFS may be a high-performance AFS comprising the inhibition additives disclosed herein. For example, the high-performance AFS may comprise one or more of the amine-based shale inhibition agents and/or the blended inhibition additive disclosed herein. In at least one embodiment, the amine-based inhibition agents may be made of, may comprise, or may consist of one or more amines that are partially neutralized with at least one acid or neutralizing acid. In an embodiment, the at least one acid may aqueous HCl. Concentrations of the one or more amines utilized in the AFS may be high or higher concentrations, such as, for example, concentrations ranging from about 0 vol % up to about 3 vol %. As a result of these high or higher concentrations, large volumes of the one or more amines are transported or may be required to be transported to drilling and/or operational locations which may or may not be poorly accessible locations. Therefore, it is more or most desirable to select an amine that can be formulated at the highest percent actives as the one or more amines utilized in the AFS.

Contrary to the amine-based inhibition agents or the blended inhibition additive disclosed herein, a known inhibitor additive, such as, for example, ULTRAHIB shale inhibitor (hereinafter "ULTRAHIB"), commercially available by Schlumberger, Houston, Texas, USA. However, chemistry of ULTRAHIB is substantially expensive, so alternative shale inhibitor may be helpful or necessary achieve one or more amines for utilization within the AFS. Such desirable amines may be, comprise, or consist of at least one co-product streams (i.e., the top and/or bottom streams disclosed herein) from one or more HMD manufacturing and/or purification processes. In some embodiments, BHMT may be at least one preferred product from not only from a performance point of view but also due to an ability to formulate BHMT at high percent actives without causing transportation issues, storage issues, use issues, or a combination thereof. By selecting and/or utilizing the bottom streams from at least one HMD purification process, increased and/or improved percent actives and/or decreased and/or improved percent water in shale inhibitor formulations may be achievable by the amine-based inhibition agents and/or the blended inhibition additives disclosed herein. Therefore, only reduced amounts of the shale inhibitor formulations disclosed herein may be required to be transported to drilling and/or operation locations. As a result, the shale inhibitor formulations disclosed herein may achieve and/or exhibit a surprisingly and/or unexpected improved sustainability profile of drilling operations.

In one or more embodiments, the one or more amines usable in the AFS may comprise one or more co-products from at least one HMD purification process as one or more effective shale inhibitors for one or more drilling operations at one or more drilling locations. For example, one or more co-products may comprise, consist of, and/or be derived from one or more bottom streams of HMD purification processes and may contain, comprise, or consist of HMD and BHMT. As a result of utilizing the co-products of the HMD purification process, the AFSs may be optimized system formulations that may achieve and/or exhibit improved sustainability profiles of the drilling operations by increasing content of actives in shale inhibitors which reduce or substantially reduce transportation costs associated with the shale inhibitors without causing one or more issues selected from performance issues, storage issues, and use-related issues.

Some issues associated with shale inhibitor additives may comprise unwanted and/or harmful corrosive effects. In a native state, the shale inhibitor additives may have high pH values (i.e., pH values>11) and may be corrosive or substantially corrosive. Due to relatively high molecular weights of the shale inhibitor additives, the shale inhibitor additives may not have a strong smell. However, in and/or during use, the shale inhibitor additives need to or must be neutralized and acceptable shale inhibitors usable in the AFS may comprise, for example, HMD, BHMT, or a combination thereof. However, when HMD is utilized in the AFS and neutralized with, for example, HCl, HMD starts to precipitate which is problematic. There are several ways to address the precipitation issue associated with HMD. For example, decreasing pH further may convert more product or HMD to hydrochloride salt which may be more water-soluble or diluting the blend or HMD with water may address the precipitation issue. However, Neither the decreasing or lower pH process nor dilution process may be desirable because decreasing/lowering pH or dilution may decrease concentration of active component in the AFS which requires more products or HMB to be used in the AFS.

Another way to address the HMD precipitation issue may be to select, incorporate, include, and/or utilize at least one different amine-based inhibition additive which may not need as much or as large amount of HCl to neutralize the amine. In an embodiment, at least one different amine-based inhibition additive may be, comprise, or consist of DCH. Due to the low or lower pKA value of DCH (i.e., 6.2, 9.6), DCH may take or require less neutralizing acid or a lower amount of the neutralizing acid to reduce the pH value. Also, owing to the cyclical structure of DCH, DCH may be less or substantially less likely to precipitate. However, DCH may not or may occasionally not be a desirable product as a shale inhibitor additive due to poor performances and high volatility associated or substantially associated with DCH.

Figure 7:
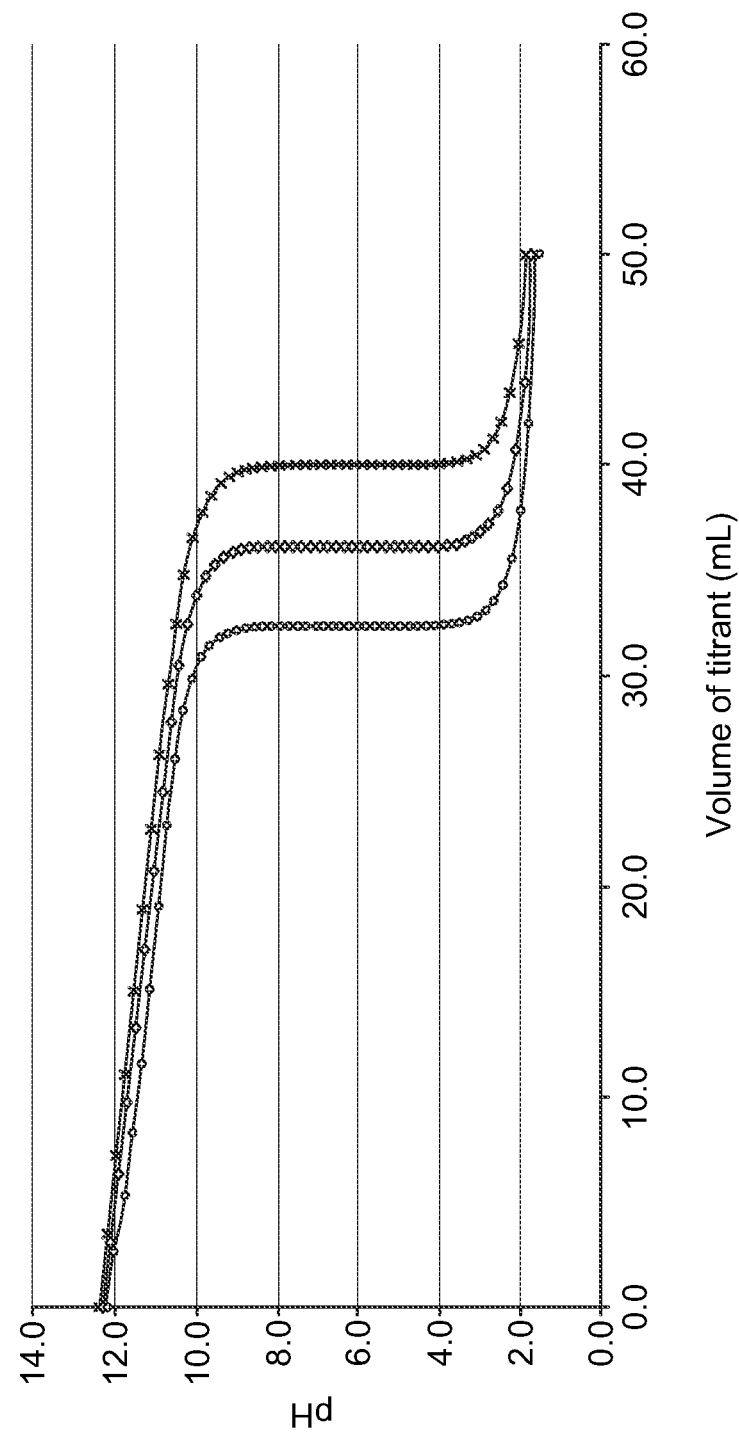
FIG. 7 illustrates graphical results of amine-based shale inhibition blends versus compositions comprising at least one amine, according to one or more examples of the present disclosure.

In some embodiments, at least one preferred amine-based inhibition agent may be BHMT (and/or HMD distillation bottoms or heavy bottoms) which is a shale inhibition product formulated effectively at high, substantially high, higher, or substantially higher percent actives which may be surprisingly and/or unexpectedly beneficial with respect to the AFS and/or at least one wellbore fluid. Calculations, graphs, and/or curves, shown in FIG. 7, demonstrate how pHs of amine-based shale inhibition blends or the blended inhibition additive disclosed herein change versus at least one composition of at least one amine (i.e., HMD, BHMT blends). The leftmost portion of the curves shown in FIG. 7 is or illustrates pure BHMT and the rightmost portion of curves shown in FIG. 7 contains substantial HMD content (i.e., 50-50 by weight of the total blends or blended inhibition additives). The graph of FIG. 7 shows that, in a case with high BHMT, pH drops with less hydrochloric acid (i.e., neutralizing acid) added which may be agreeable with theory due to the lower amine number of BHMT (i.e., 760 mg KOH/g) verses HMD (i.e., 965 mg KOH/g).

In one or more embodiments, another benefit of utilizing BHMT may be that BHMT is less crystalline than or verses HMD. For example, a co-product from an HMD purification process may be rich in HMD and/or may precipitate at room temperature. In contrast, BHMT is less likely to precipitate.

Figure 8:
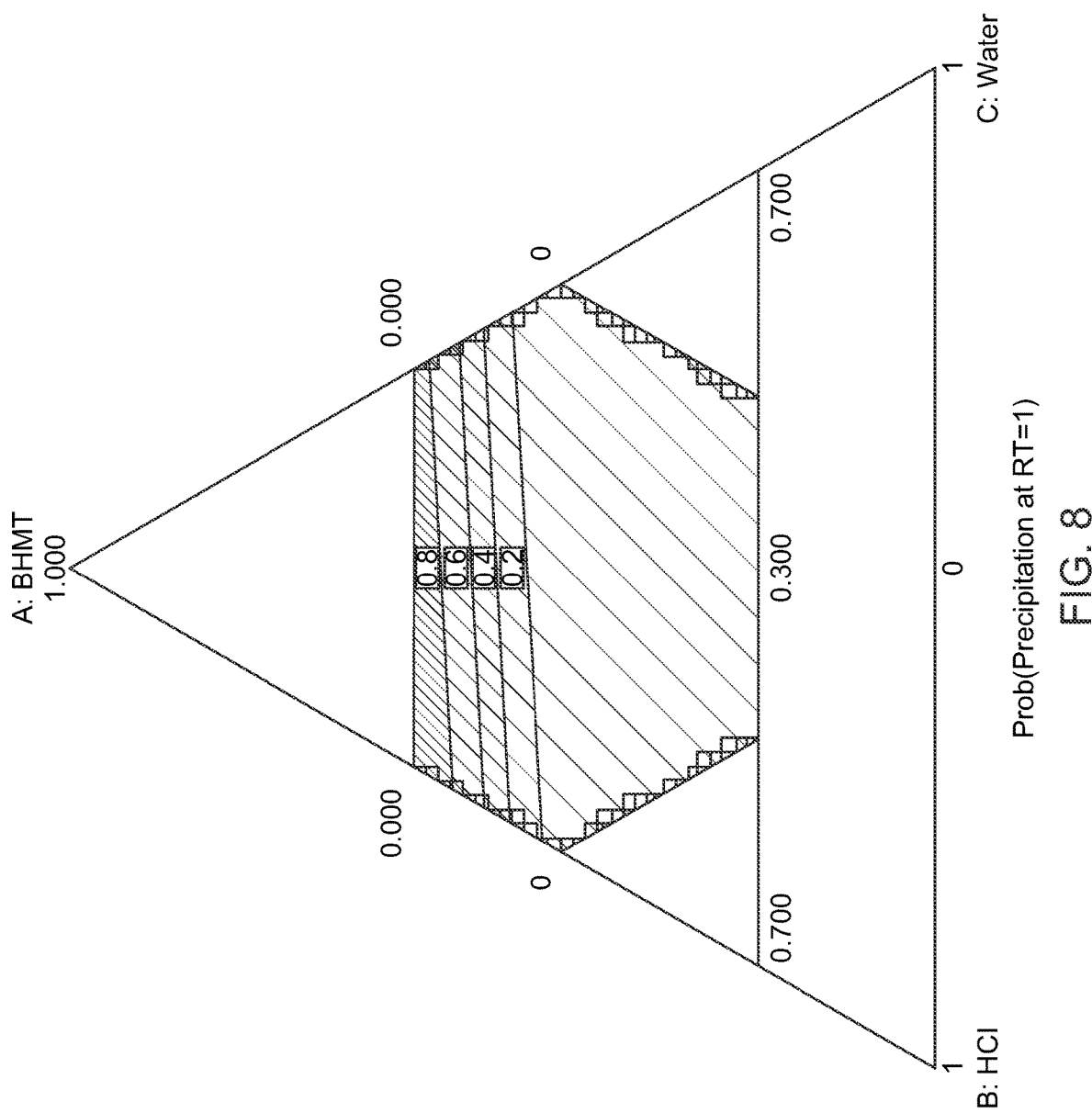
FIG. 8 illustrates a ternary diagram showing chances of precipitation for Bis(hexamethylene)triamine, acid, and water at room temperature, according to one or more examples of the present disclosure.

FIG. 8 shows chances of precipitation for a ternary diagram of BHMT amine, acid, and water at room temperature. In the ternary diagram, the uppermost hatched region (having the narrowest spacing between adjacent hatchings) means or represents one-hundred percent (i.e., 100%) chance of precipitation and the lowermost hatched region (having the widest spacing between adjacent hatchings) means or represents zero percent (i.e., 0%) chance of precipitation. As see in FIG. 8, likelihood of precipitation is very low at room temperature across many blends of amine, acid, and water. Since neutralization of pure amine is required, this means or illustrates that the amount of water can or may be reduced in the blend at a given pH value, and the amount of active components/agents can be or may be increased.

EXAMPLES

In the following examples, a series of experiments were conducted to illustrate hydration inhibition performances for the shale inhibition additives and/or agents, or the blended inhibition additive disclosed herein in clay samples using the wellbore fluids in accordance with the present disclosure. In the following examples, references to HMD (i.e., hexamethylenediamine) and BHMT (i.e., Bis(hexamethylene)triamine) may refer to byproduct streams containing both HMD and BHMT and/or may not refer to the specific molecules of HMD and BHMT. The BHMT utilized in the following examples was not pure refined BHMT grade but was, instead, a byproduct stream comprising mainly BHMT and a lesser amount of HMD. The performances of blend streams of BHMT and HMD or the blended inhibition additive were investigated and ratios of 100:0, 75:25 (i.e., 3:1), and 50:50 (i.e., 1:1) by weight of BHMT to HMD were tested in the following examples. Amines were blended and then neutralized with HCl (i.e., neutralizing acid) followed by concentration adjustment to keep all of the amines at 40 wt. % amine in the blend or the blended inhibition additive. In other embodiments, the blended amines may be at least partially neutralized with at least one acid or neutralizing acid.

Example 1

Details of a wellbore fluid formulation utilized to test one or more blends of amines as shale inhibitors are shown below in Table 1.

TABLE 1

| Inhibitor | 10.00 |
|---|---|
| IDCAP D | 1.00 |
| Polypac UL | 2.00 |
| DuoVis | 1.25 |
| Ultrafree | 7.00 |
| API Clay | 15.00 |
| M-I WATE | 129.9 |
| Vol, mL | 350 |
| Mw, ppg | 11.00 |

The formulation set forth in Table 1 was blended, ARNE clay (hereinafter "the clay") was then added to the blend to form a mixture, and the mixture was rolled in an oven for 16 hours. For this example, the clay comprised of clay chunks from about 4 millimeters (hereinafter "mm") to about 6 mm which is typical for the type of testing in Example 1. The clay utilized in subsequent examples for MBT test comprised of powdered clay particles.

The clay was subsequently removed by filtration and bulk hardness test was done. The procedure steps are typical for the present industry. Testing results for the inhibitor blends with respect to rheology and effect on ARNE clay are shown in Table 2. Rheology in these experiments is similar but bulk hardness results were better with higher content of BHMT. Less turns on bulk hardness meter to reach 80 in-lbs torque indicates that the shale is more inhibited. Similarly, higher torque value after completing 4 turns on bulk hardness meter also indicates that the shale is harder and is more inhibited.

TABLE 2

|  | 100% BHMT | 75-25 BHMT-HMD | 50-50 BHMT-HMD |
|---|---|---|---|
| R600, °VG | 72 | 71.4 | 71.2 |
| R300, °VG | 52.5 | 54.4 | 53.2 |
| R200, °VG | 41.7 | 40.3 | 40.7 |
| R100, °VG | 29 | 27.9 | 28 |
| R6, °VG | 10.1 | 9.9 | 9.4 |
| R3, °VG | 8.8 | 8.3 | 7.6 |
| PV, cP | 20 | 17 | 18 |
| YP, lb/100 ft$^2$ | 33 | 37 | 35 |
| LSYP, lb/100 ft$^2$ | 8 | 7 | 6 |
| 10-sec Gel, lb/100 ft$^2$ | 10 | 9.2 | 8.2 |
| 10-min Gel, lb/100 ft$^2$ | 12.3 | 14.7 | 12.5 |
| % moisture after disperson test | 24.02% | 24.58% | 24.34% |
| bulk hardness. Turns 20-80 in/lbs | 3 | 4.3 | 4.3 |
| reading at 4 turns | 92 | 76 | 72 |

Example 2

Another example comparing the performance of the amines disclosed herein is as follows. In this example, ARNE clay dispersion was investigated and tested. ARNE clay is typically highly dispersive, and a better inhibited clay disperses less. Details of a wellbore fluid formulation for this shale dispersion test is shown in Table 3. A comprehensive response surface study (hereinafter referred to as "the comprehensive study" or "the DOE study") was performed to establish a trend across a range of inhibitor concentrations. The comprehensive study included comparisons between multiple changing variables, such as, for example, different shale inhibitors and different quantities of shale inhibitors on shale dispersions. The results of comprehensive study shown in FIG. 1. Higher values are advantageous because the higher values indicate less ARNE clay dispersed. The mixture of 50:50 BHMT:HMD blend shows lower result than BHMT which again confirms that ratio of BHMT to HMD influences inhibitor performance and more BHMT performs better.

TABLE 3

| 3.6% KCl brine | 327.38 |
|---|---|
| Inhibitor | variable |
| Magnesium oxide | 1.00 |
| Flo-Trol | 7.00 |
| DuoVis | 1.00 |
| Glydril MC | 7.07 |
| Safe-Carb 40 | 35.4 |

TABLE 3-continued

| Vol, mL | 350 |
|---|---|
| Mw, ppg | 9.10 |

Example 3

In another example, a series of shale inhibitors were compared for their ability to reduce cation exchange capacity in the clays (i.e., powdered clay particles). In this example, 350 ml water was mixed 45 grams sodium bentonite with cation exchange capacity of 85 meq/gram and treated with different shale inhibitors at different concentrations (i.e., the DOE study). After the mixing was completed, residual CEC values were measured. Better inhibitors may reduce CEC values by the most because the better inhibitors may have strongest interactions with the shales. The MBT test results for the above-mentioned bentonite with different shale inhibitors are shown in FIG. 2 and expressed as MBT in ppb bentonite equivalency which is a common method of expressing residual cation exchange activity of inhibited clay in the industry. Here, BHMT achieves a lower MBT result than a blend of BHMT and HMD indicating that a byproduct stream with more BHMT is better than a 50:50 blend BHMT and HMD. The left-hand image of FIG. 2 shows the effect verses the amount of shale inhibitor utilized and with sufficiently high loading of inhibitor, most of cation exchange sites on clay are taken up by inhibitor.

Example 4

At least one reason for improved performance of the streams containing high fraction of BHMT is due to improved interactions of BHMT with the shales over HMD. An analysis on the aqueous phase of a drilling fluid for BHMT and HMD was completed, and it was determined that in presence of both amines, surprisingly and unexpectedly BHMT is selectively adsorbed.

Figure 9:
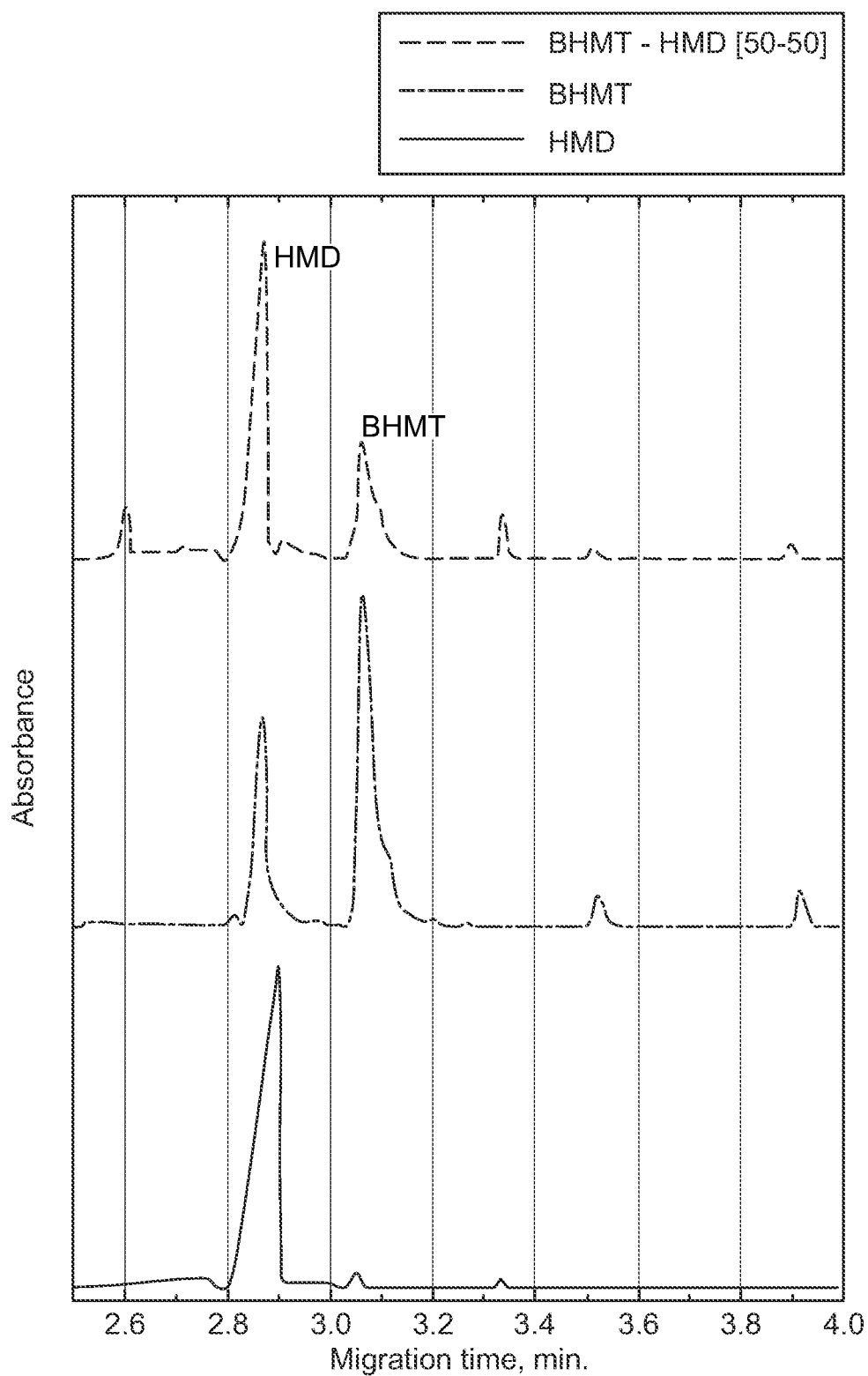
FIG. 9 illustrates graphical results of signal analysis of three independent and individual components (i.e., Bis(hexamethylene)triamine, hexamethylenediamine, and Bis(hexamethylene)triamine and hexamethylenediamine blend) according to one or more examples of the present disclosure.
Figure 10:
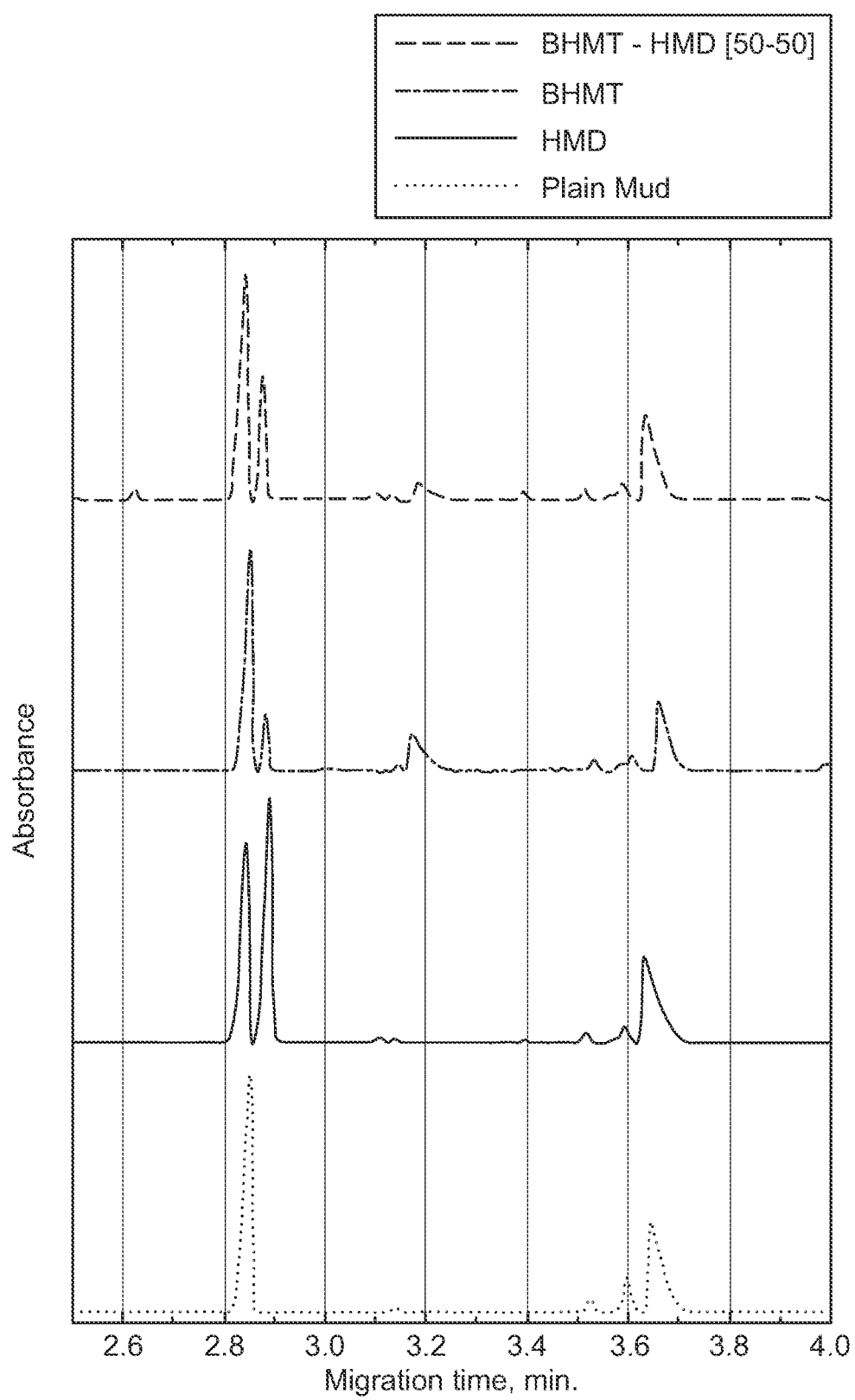
FIG. 10 illustrates graphical results of signal analysis of whole mud prepared with the three components as set forth in FIG. 9, according to one or more examples of the present disclosure.
Figure 11:
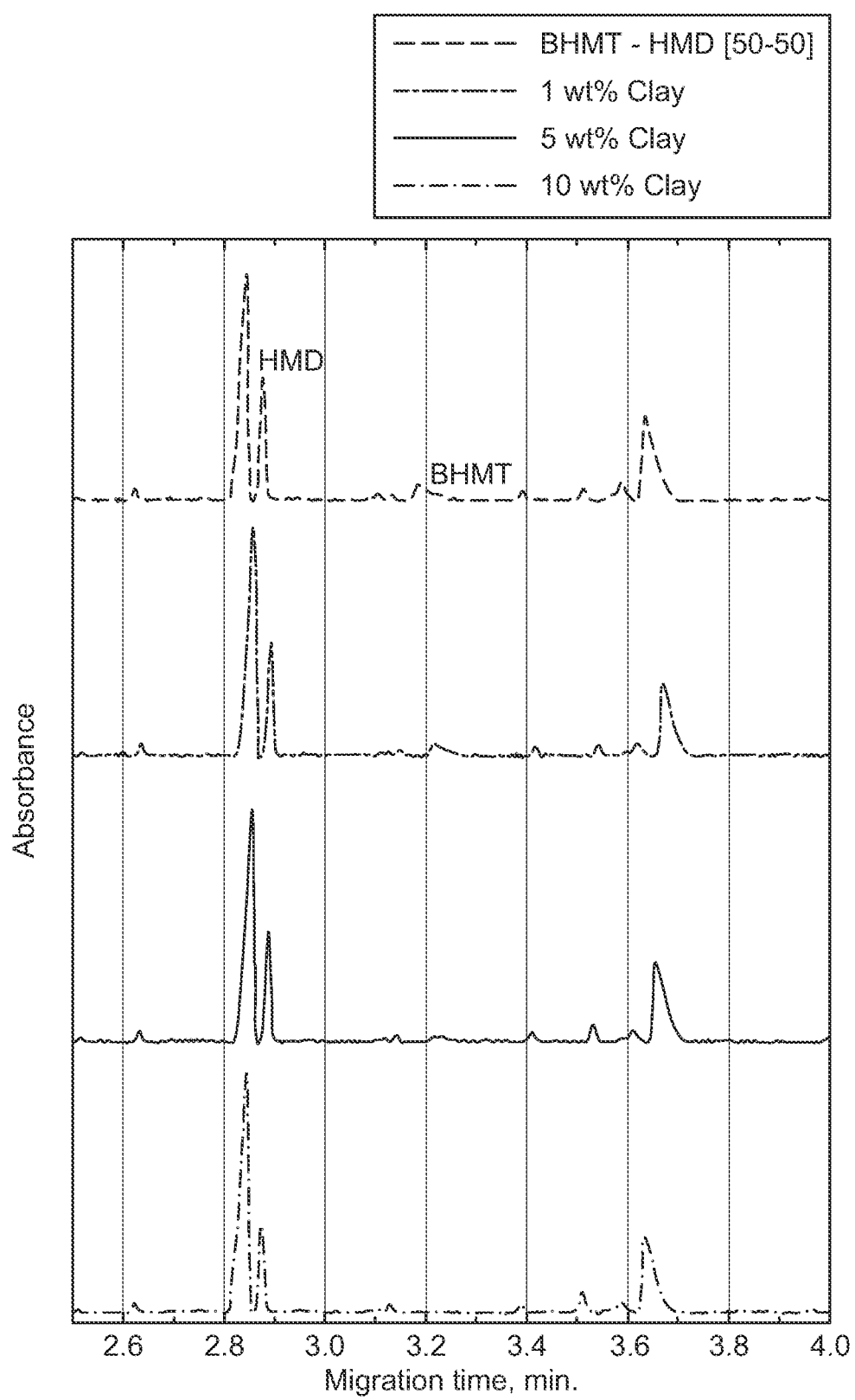
FIG. 11 illustrates graphical results of signal analysis of residual hexamethylenediamine—Bis(hexamethylene)triamine for systems with different amounts of clay, according to one or more examples of the present disclosure.

To confidently identify the signals in the analysis, the HMD, BHMT, and BHMT-HMD components were analyzed individually and independently. FIG. 9 presents the signal analysis of said components, and FIG. 10 presents the signal analysis of whole mud prepared with said components. To confirm preferential adsorption of BHMT on clay, a clay slurry was treated with a 50:50 blend of BHMT and HMD amines. Different concentrations of clay were used to evaluate effects on inhibitor adsorption based on clay-inhibitor ratios. FIG. 11 shows the graphical results of signal analysis for residual HMD-BHMT for systems with or having different amounts of clay. From the signal analysis results for residual HMD-BHMT, it is evident that BHMT has more affinity to the clay when compared to HMD. With incremental clay loadings, the BHMT peak decreased in size which indicates BHMT is interacting with clay. Only after all BHMT was consumed, the HMD peak starts to decrease in size.

The findings on selective adsorption and byproduct streams with high proportion of BHMT working better may be important because the findings confirm that for a mixture of BHMT-HMD, a higher fraction of BHMT may be preferred. The ratio of these two amine-based components becomes even more important for the cost-sensitive applications. It is often a common practice to reduce the amount of inhibitor added to control costs. With low loading of inhibitor mix and/or large amount of high reactivity shale, it may be possible that BHMT will be depleted from the solution, then HMD will react with shale, and HMD may be less effective shale inhibitor which means part of the clay will not be efficiently inhibited.

Example 5

In this example, the focus was on weight ratios of HMD to BHMT and demonstrated and compared performances of a 50:50 weight ratio of HMD:BHMT additive versus a nearly pure BHMT additive. However, at 50:50 weight ratio of HMD to BHMT, the molar ratio is 65:35 or, in other words, there is nearly twice as many HMD molecules as BHMT molecules. Since cation exchange and inhibition reaction occurs when 1 molecule is exchanged on clay, it was identified that the 50:50 HMD-BHMT blend has a low number of BHMT molecules. Combined with the understanding of selective adsorption, it was determined that test streams with high BHMT content work better as shale inhibitor.

Testing for effectiveness of shale inhibitor may be done in several ways. In FIG. 2, adsorption on amine on dispersed clay was shown which is a common testing protocol. To achieve maximum inhibition of shale, synergistic effects of viscosifier and amine/inhibitor agents disclosed herein may be at least one important factor. In this example, synergistic effects of other additives present in the drilling fluid with amines on performance as shale inhibitor are achieved with inhibition additives and agents disclosed herein. A wellbore fluid formulation for testing synergies between amine inhibitor(s) and other mud components is shown in Table 4.

TABLE 4

| | |
|---|---|
| 1% NaCl | 295.51 |
| BHMT | 10.00 |
| IDCAP D | 1.59 |
| Polypac UL | 2.00 |
| DuoVis | 1.08 |
| Ultrafree | 7.00 |
| API Clay | 15.00 |
| M-I WATE | 130.0 |
| Vol, mL | 350 |
| Mw, ppg | 11.00 |

Figure 3:
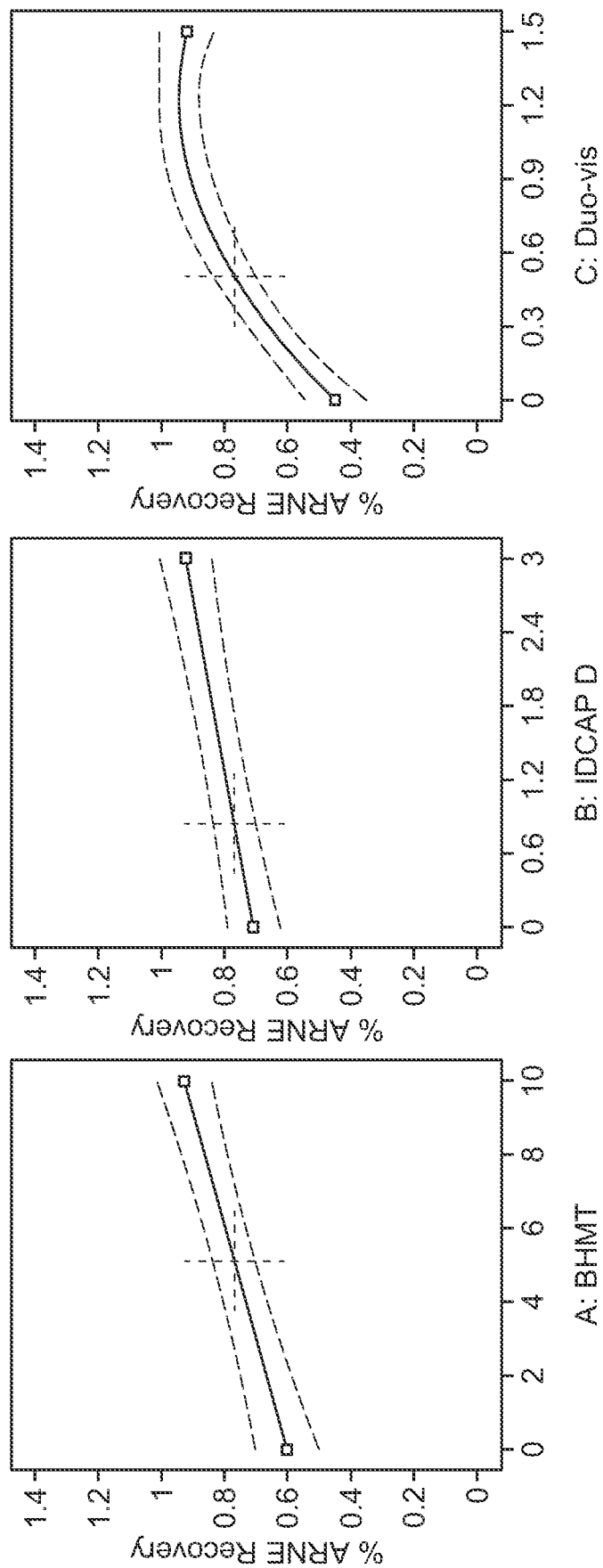
FIG. 3 illustrates graphical results of ARNE clay recovery after dispersion test as a function of encapsulator and viscosifier, according to one or more examples of the present disclosure.
Figure 4:
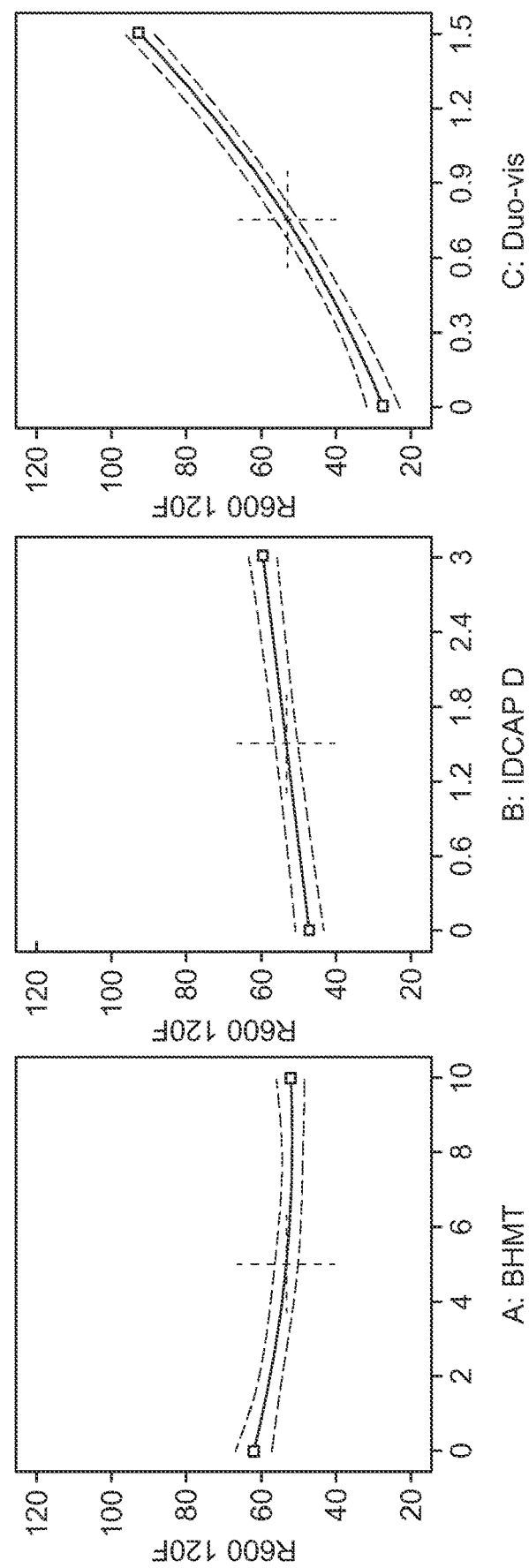
FIG. 4 illustrates graphical results of the rheology effects from different additives at 600 rpm and 120° F. on FANN35, according to one or more examples of the present disclosure.

In the wellbore fluid formulation in Table 4, amounts of IDCAP™ D (i.e., encapsulator), DUOVIS® (i.e., viscosifier), and BHMT additives were changed. After WBM was formulated, 40 grams of ARNE shale was added to the container to form a mixture, and the mixture was hot rolled for 16 hours at 150° F. After the hot roll treatment, shale was recovered on a sieve and a percent recovery of clay was measured. A more inhibitive system would result in higher shale recovery. A matrix of 28 tests was completed to create a comprehensive relationship between additives (i.e., encapsulator and viscosifier) with BHMT ranging from 0 to 10 ppb, IDCAP™ D ranging from 0 to 3 ppb, and DUOVIS® ranging from 0 to 1 ppb. In FIG. 3, results of ARNE clay recovery after dispersion test as a function of the encapsulator and the viscosifier. FIG. 3 shows that at least 0.6 ppb DUOVIS® additive is needed to achieve an acceptable result. Continued increase in DUOVIS® improves shale recovery, but only up to a point. With >1 ppb DUOVIS® may not provide an additional benefit. However, continued increase in DUOVIS® increases rheology of WBM (see FIG. 4). Therefore, for effective inhibition the ratio between additives may be of significance. The ratio may depend on the mud weight, but in the example provided, it may be preferred to increase concentration of BHMT to 10 ppb and maintain DUOVIS® concentration in 0.6-1 ppb range for optimal shale inhibition and acceptable rheological properties. Testing BHMT in water with the clay may not have worked well and/or may not have been able to differentiate BHMT from HMD and/or other inhibitor agents of the inhibitor additive.

Example 6

Figure 5A:
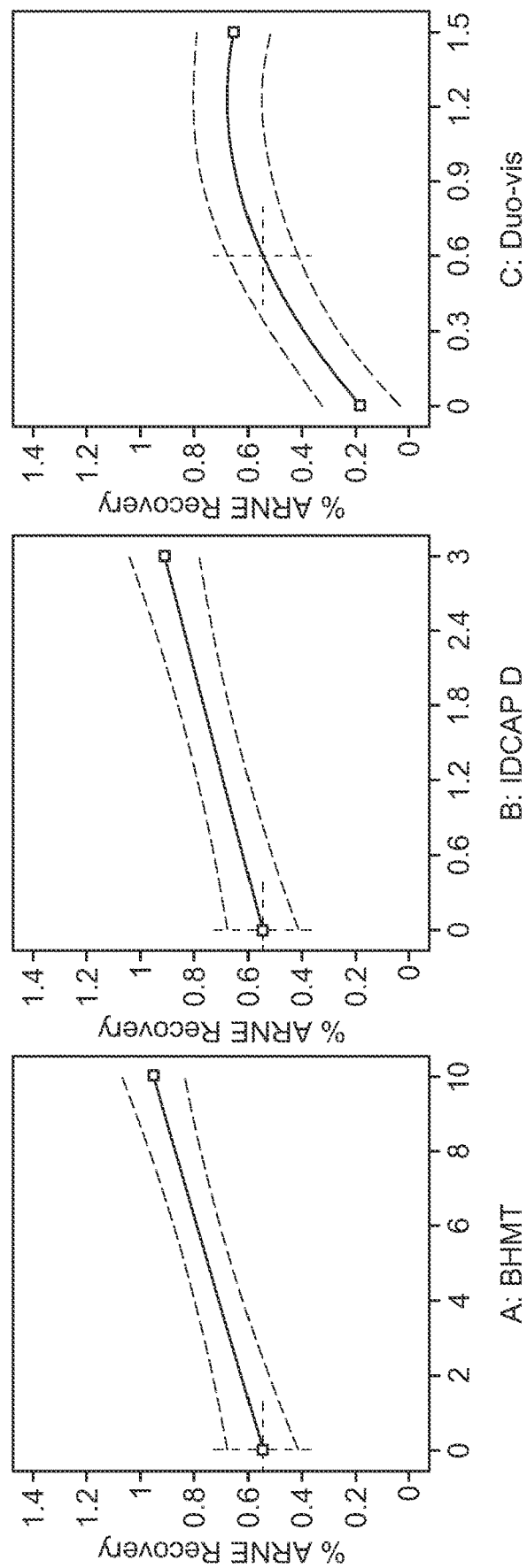
FIGS. 5A-5C illustrate graphical results of model analysis based on multiple experiments for ARNE clay recover for three different scenarios, according to one or more examples of the present disclosure.
Figure 5B:
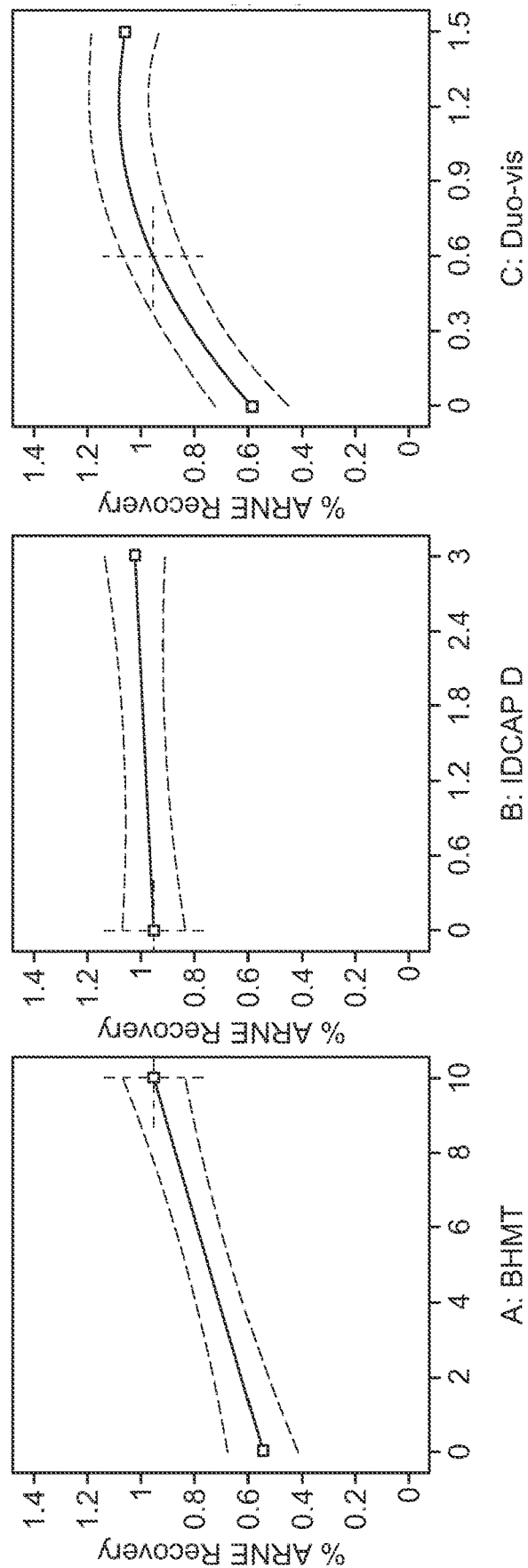
Figure 5C:
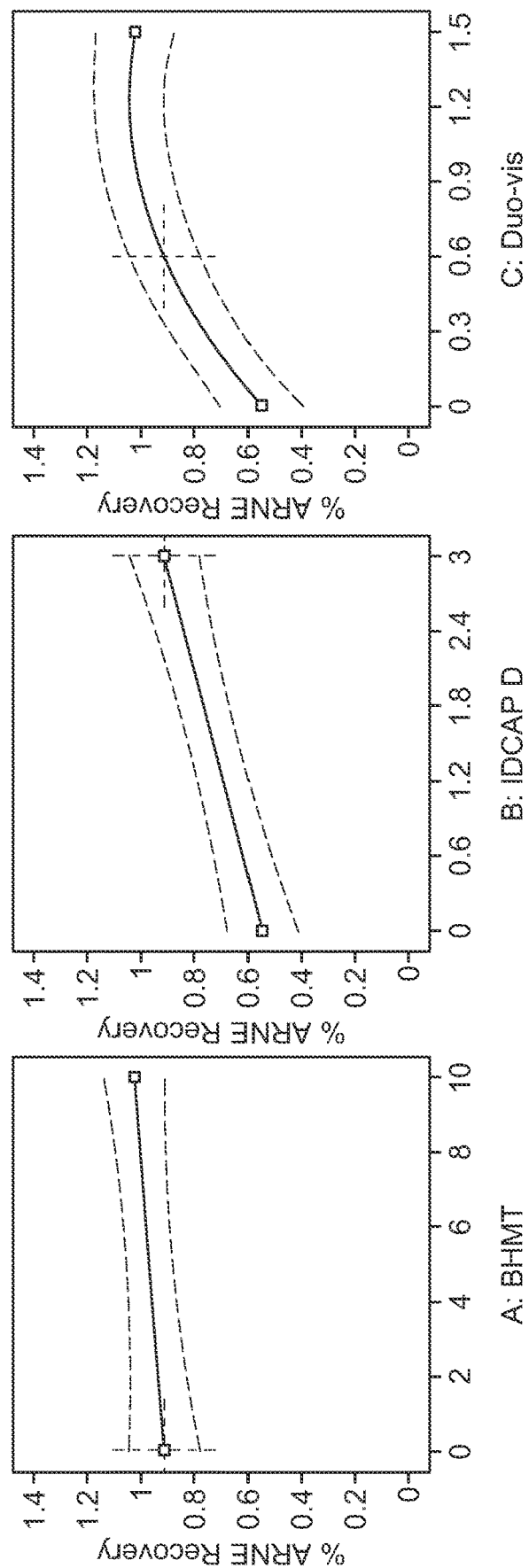

In another example, the importance of testing all components together in a mud formulation and the ratio is illustrated in FIGS. 5A-5C. In addition to showing synergistic effects, testing all components together demonstrates lack of any antagonistic effect(s) which is also an important aspect with respect to identifying an efficient and/or useful wellbore or drilling fluid. In some fluids, cationic amines may negatively interact with one or more additives of the fluids which may cause precipitate to form in the fluids. As a result, neither the cationic amines nor the anionic additives may efficiently work together when combined in the fluids.

More specifically, FIGS. 5A-5C show graphical analysis results of the model based on 23 experiments for ARNE recover for the following different scenarios: 1) no BHMT, and no IDCAP™ D (see FIG. 5A); 2) 10 ppb BHMT, and no IDCAP™ D (see FIG. 5B); and 3) no BHMT, and 3 ppb IDCAP™ D (see FIG. 5C). With no BHMT and no IDCAP™ D (see charts in FIG. 5A) and fixed amount of DUOVIS® (shown as baseline of charts in FIG. 5A) as indicated by the crosshairs, it is shown that ARNE recovery is improved with either addition of BHMT or IDCAP™ D. However, when BHMT is increased from 0 to 10 ppb (see the crosshairs of the charts in FIG. 5B indicating concentrations), then IDCAP™ D effect disappears and, similarly, increase in IDCAP™ D from 0 to 3 ppb shows effect of BHMT disappearing (see charts in FIG. 5C).

Since BHMT may be at least one component that does not meaningfully increase the viscosity (see FIG. 4), it may be preferred to maintain a high ratio of BHMT to encapsulating polymer to achieve maximum shale recovery. Ratios of 3:1 to 10:1 or more of BHMT:IDCAP™ D are acceptable. At the same time, viscosifying polymer should also be present in the system at a ratio of at least 0.3 ppb DUOVIS® to 1 ppb BHMT.

Example 7

In this example, the synergistic importance is observed in the drilling fluids disclosed herein. One example of a substantial change in the drilling fluid may be fluid weight. Table 4 shows wellbore fluid formulation at 11 ppg with examples given on influence of viscosifier, IDCAP™ D encapsulator, and BHMT shale inhibitor. Similarly, the effect of synergistic behavior may be observed in fluids at a different mud weight. Table 5 shows a wellbore fluid formulation at 14 ppg. In this example, IDCAP™ D was varied from 0 to 3 ppb and DUOVIS® ranged from 0 to 1 ppb with BHMT remaining fixed at 7 ppb. The testing protocol for this example is same as set forth above.

TABLE 5

| | |
|---|---|
| 1% NaCl | 257.80 |
| BHMT-based inhibitor | 7.00 |
| IDCAP D | 1.82 |
| Polypac UL | 2.00 |
| DuoVis | 0.50 |
| Ultrafree | 7.00 |

TABLE 5-continued

| | |
|---|---|
| API Clay | 15.00 |
| M-I WATE | 297.1 |
| Vol, mL | 350 |
| Mw, ppg | 14.00 |

Figure 6:
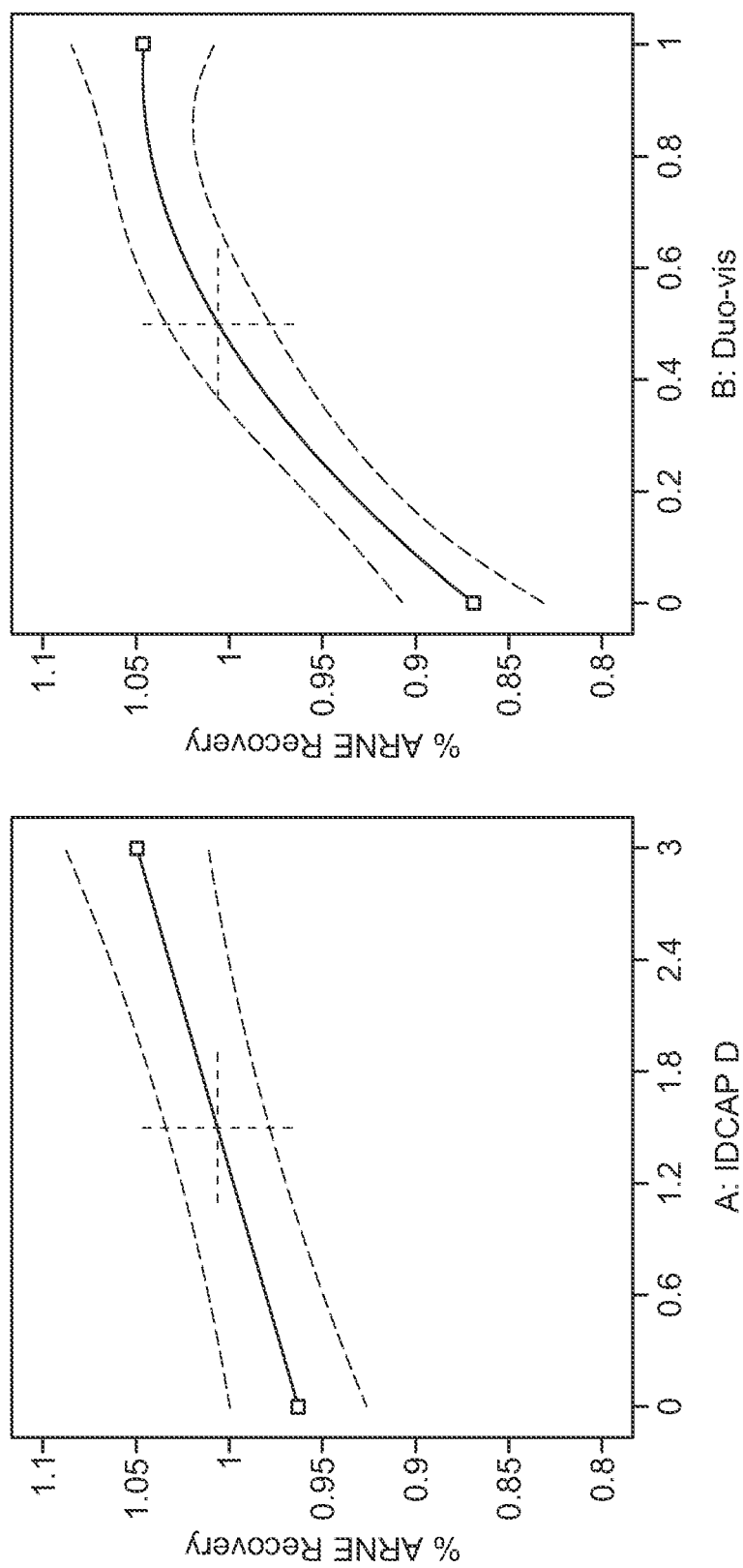
FIG. 6 illustrates graphical results for ARNE clay recovery from a 14 pound per gallon (hereinafter "ppg") fluid experiment with a wellbore fluid formulation disclosed herein, according to one or more examples of the present disclosure.

In FIG. 6, it is observed that amount of DUOVIS® matters should be at least about 0.6 ppb. Additional, DUOVIS® does not improve ARNE recovery, while continuously providing increased viscosity. High shale recovery is desirable while high viscosity is not desirable. The BHMT-based inhibitor comprised about 40% by weight amine blended with acid and water. The ratio of viscosifiers to amine inhibitor agents may be different from examples at about 11 ppg specified above because fluid density is different. However, the results are similar that it is not only BHMT or other amine providing inhibition but it is a synergistic effect of these different wellbore fluid components that may achieve one or more unexpected synergies.

Example 8

This example highlights one or more synergistic effects of shale inhibitors disclosed herein with various wellbore fluid additives observed by comparing shale recovery for wellbore fluid formulations shown in Table 6. In Example 8, BHMT is at same levels, but one fluid formulation includes IDCAP™ D only (see first/top formulation in Table 6) and the other fluid formulation POWERVIS™ (see second/bottom formulation in Table 6) and shale recovery is different at about 84% ARNE recovery for first/top formulation and about 92% for the second/bottom formulation; therefore, there are one or more synergistic effects of amine shale inhibitor disclosed herein with other components of the wellbore fluids, and one or more viscosifiers (DUOVIS®, POWERVIS™), encapsulators (IDCAP™ D, ULTRACAP™, etc.) should be used in combination with effective amine inhibitor to achieve the desired result. POWERVIS™ is a linear biopolymer viscosifier and ULTRACAP™ is polymeric cuttings encapsulator and clay dispersion inhibitor, both available from M-I L.L.C. (Houston, Tex.).

TABLE 6

| | |
|---|---|
| 1% NaCl | 259.39 |
| BHMT | 7.00 |
| IDCAP D | 0.92 |
| Polypac UL | 2.00 |
| DuoVis | 0.00 |
| Ultrafree | 7.00 |
| API Clay | 15.00 |
| M-I WATE | 296.9 |
| 1% NaCl | 260.23 |
| BHMT | 7.00 |
| IDCAP D | 0.00 |
| Polypac UL | 2.00 |
| Powervis | 0.25 |
| Ultrafree | 7.00 |
| API Clay | 15.00 |
| M-I WATE | 296.8 |

In view of the foregoing, the wellbore fluids and inhibition additives and/or agents disclosed herein are usable to efficiently inhibit shale hydration and reduce fluid loss while operating in shale- or clay-containing subterranean formations. Shale inhibitor additives disclosed herein are also effective at preventing hydrations of high kaolinite/high illite fraction shales and may reduce the potential for wellbore instabilities due to balling, agglomeration, and accretion of drill cuttings.

Example 9

In this example, a shale inhibitor additive or formulation blend comprising BHMT in accordance with one or more embodiments disclosed herein is shown in Table

TABLE 7

| Sample Name | Property | Result |
|---|---|---|
| BHMT neutralized | pH | pH is 9.99 |
| BHMT neutralized | Chlorides | chloride concentration is 13.5% |
| BHMT neutralized | Pour Point | the pour point is −35° C. |
| BHMT neutralized | Water | Theory - 35% |

The blend set forth in Table 7 contains 50 wt. % or DYTEK BHMT, 40 wt. % HCl, and 10 wt. % water, wherein all wt. % are based on or calculated to a total weight of the blend. As shown in the Results column of Table 7, pH is acceptable or substantially acceptable for inhibitor additive blend in AFS and pour point is low, substantially low, or very low.

Based on the pour point results in Table 7, it is or may be feasible or substantially feasible to further increase amount of BHMT in the blend. Since partial neutralization is still required to avoid corrosive nature of "as is" BHMT, 1 mole BHMT may be blended with 1.8 moles of HCl which will produce a mixture with a pH value of 10.5 and water content of 29 wt. % with the rest of the mixture or blend being the active component (i.e., BHMT salt).

In some embodiments, at least one acid or neutralizing acid, such as, for example, HCl may be utilized with the amine-based inhibition agents disclosed herein for one or more economic reasons. However, chlorides may not be always environmentally accepted. As a result and/or for this environmental reason, BHMT may be effectively neutralized with, for example formic acid. A comparative example for chloride versus formate is provided in Table 8. At same pH and same water content, a formate version of BHMT has a lower, substantially lower, or much lower pour point when directedly compared to a chloride version of BHMT as shown in Table 8.

TABLE 8

| | | | |
|---|---|---|---|
| BHMT HCl version | pH (5% solution) | TM #0640 | 9.51 |
| BHMT Formic version | pH (5% solution) | TM #0640 | 9.51 |
| BHMT HCl version | Water content (%) | TM #0539 | 40.9 |
| BHMT Formic version | Water content (%) | TM #0539 | 40.0 |
| BHMT HCl version | Pour point (° C.) | TM #0718 | −28 |
| BHMT Formic version | Pour point (° C.) | TM #0718 | −73 |

Due to low pour point and/or lower water content of formic acid (i.e., 88% formic is common commercially), it is possible to create BHMT formate formulation or composition containing 1 mole BHMT and 1.8 mole formic acid which will have a pH of approximately 10.5. The formulation or composition will contain 3.7-4% water with the rest being actives. If viscosity is too high, the blend may be diluted prior to usage. Concentrates with low water contents may be more desirable for transportation due to high percent actives and moderate to low water content which may reduce the amount of material (i.e., formulation, composition, or blend) requiring and/or necessitating transportation.

When a co-product from HMD purification stream is used, selecting "heavy bottoms" or BHMT may give or provide high performance product and/or may allow a formulation, composition, or blend with high percent actives which may reduce transportation cost of the high performance product and/or may reduce storage space of inhibitor (i.e., the high performance product) on location.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A wellbore fluid, comprising:
   an aqueous base fluid;
   a shale inhibition additive comprising at least one hydrophobic amine that is a neutralized byproduct of a Nylon-6,6 manufacturing process, wherein the at least one hydrophobic amine is present at a concentration of at least about 40% of a total active amine concentration of the shale inhibition additive; and
   at least one polymeric viscosifier;
   wherein the at least one hydrophobic amine comprises a triamine-based shale inhibition agent and a diamine-based shale inhibition agent, and a ratio of the triamine-based shale inhibition agent to the diamine-based shale inhibition agent is from about 3:1 to about 10:1, and
   wherein the wellbore fluid facilitates at least one of an increase in bulk hardness, an increase in shale inhibition, an increase in inhibition agent adsorption, a decrease in clay dispersion, or a decrease in cation exchange activity when the wellbore fluid is introduced into a subterranean formation.

2. The wellbore fluid of claim 1, wherein the at least one polymeric viscosifier is selected from the group consisting of xanthan gum, diutan gum, gellan gum, welan gum, schleroglucan gum, and at least one mixture thereof.

3. The wellbore fluid of claim 1, wherein the diamine-based shale inhibition agent is present at a concentration of at least about 1% by weight and less than about 50% by weight, calculated to a total weight of the triamine-based shale inhibition agent and the diamine-based shale inhibition agent.

4. The wellbore fluid of claim 1, wherein the ratio of the triamine-based shale inhibition agent to the diamine-based shale inhibition agent is from about 5:1 to about 10:1.

5. The wellbore fluid of claim 1, wherein a concentration of the triamine-based shale inhibition agent is at least about 70% by weight, calculated to a total weight of the triamine-based shale inhibition agent and the diamine-based shale inhibition agent.

6. The wellbore fluid of claim 1, wherein the triamine-based shale inhibition agent comprises Bis(hexamethylene)triamine and the diamine-based shale inhibition agent comprises hexamethylenediamine.

7. The wellbore fluid of claim 1, wherein the wellbore fluid has a pH value of about 8.5 to about 11.

8. The wellbore fluid of claim 1, wherein the neutralized byproduct of a Nylon-6,6 manufacturing process comprises Bis(hexamethylene)triamine neutralized with at least one neutralizing acid, and wherein the shale inhibition additive has a pH value of at least about 9 and no more than about 11 and a water content of no more than about 40 percent by weight, calculated to a total weight of the shale inhibition additive.

9. The wellbore fluid of claim 8, wherein the at least one neutralizing acid is selected from the group consisting of hydrochloric acid, formic acid, and a combination thereof.

10. The wellbore fluid of claim 8, wherein the at least one neutralizing acid comprises concentrated hydrochloric acid and the water content of the shale inhibition additive is no more than about 30 percent by weight, calculated to a total weight of the shale inhibition additive.

11. The wellbore fluid of claim 8, wherein the at least one neutralizing acid comprises anhydrous HCl and the water content of the shale inhibition additive is about 0 percent by weight, calculated to the total weight of the shale inhibition additive.

12. The wellbore fluid of claim 8, wherein the at least one neutralizing acid comprises formic acid and the shale inhibition additive comprises a chloride-free inhibition additive.

13. The wellbore fluid of claim 1, wherein the at least one polymeric viscosifier comprises one or more natural biopolymers.

14. A method of drilling, the method comprising:
    circulating the wellbore fluid of claim 1 in a wellbore disposed within a clay-containing subterranean formation, wherein the wellbore fluid has a pH value of about 8.5 to about 11.

15. The method of claim 14, wherein the neutralized byproduct of a Nylon-6,6 manufacturing process comprises Bis(hexamethylene)triamine neutralized with one or more neutralizing acids, and wherein the shale inhibition additive has a pH value of at least about 9 and no more than about 11 and a water content of no more than about 40 percent by weight, calculated to a total weight of the shale inhibition additive.

16. The method of claim 14, wherein the diamine-based shale inhibition agent comprises hexamethylenediamine.

17. The method of claim 14, wherein the triamine-based shale inhibition agent comprises Bis(hexamethylene)triamine.

18. A method of drilling, the method comprising:
    emplacing the wellbore fluid of claim 1 in a wellbore during a first circulation of the wellbore fluid within the wellbore, wherein the wellbore is disposed within a clay-containing subterranean formation, the wellbore fluid has a pH value of about 8.5 to about 11; and
    maintaining the concentration of the triamine-based shale inhibition agent at or above about 50% by weight, calculated to the total weight of the triamine-based shale inhibition agent and the diamine-based shale inhibition agent, during at least one subsequent second circulation of the wellbore fluid within the wellbore.

19. The method of claim 18, further comprising:
    loading the shale inhibition additive into the wellbore fluid before the first and the at least one subsequent second circulations such that the concentration of the triamine-based shale inhibition agent is at or above about 75% by weight, calculated to the total weight of the triamine-based shale inhibition agent and the diamine-based shale inhibition agent, during the first circulation and the at least one subsequent second circulation.

* * * * *